United States Patent
Bhatia et al.

(10) Patent No.: US 10,089,674 B1
(45) Date of Patent: Oct. 2, 2018

(54) ORDERING A SET OF DATA ASSOCIATED WITH AN ITEM

(71) Applicant: Amazon Technologies, Inc., Seattle, WA (US)

(72) Inventors: Sandeep Bhatia, Redmond, WA (US); Lynn Mendenhall, Seattle, WA (US); Damian Poznanski, Bonney Lake, WA (US)

(73) Assignee: Amazon Technologies, Inc., Seattle, WA (US)

(*) Notice: Subject to any disclaimer, the term of this patent is extended or adjusted under 35 U.S.C. 154(b) by 698 days.

(21) Appl. No.: 14/663,334

(22) Filed: Mar. 19, 2015

(51) Int. Cl.
G06Q 30/00 (2012.01)
G06Q 30/06 (2012.01)
G06F 17/30 (2006.01)

(52) U.S. Cl.
CPC ... *G06Q 30/0627* (2013.01); *G06F 17/30424* (2013.01); *G06F 17/30598* (2013.01)

(58) Field of Classification Search
None
See application file for complete search history.

(56) References Cited

U.S. PATENT DOCUMENTS

| | | | | |
|---|---|---|---|---|
| 8,326,835 B1 * | 12/2012 | Munter | | G06F 17/30994 707/737 |
| 2004/0030689 A1 * | 2/2004 | Anderson | | G06F 17/3061 |
| 2006/0059062 A1 * | 3/2006 | Wood | | G06Q 30/0603 705/35 |
| 2009/0070786 A1 * | 3/2009 | Alves | | G06F 9/541 719/318 |
| 2010/0088315 A1 * | 4/2010 | Netz | | G06F 17/30501 707/737 |
| 2012/0159393 A1 * | 6/2012 | Sethi | | G06F 17/30554 715/830 |
| 2014/0025626 A1 * | 1/2014 | Mefford | | G06F 17/30864 707/603 |
| 2014/0344293 A1 * | 11/2014 | Yamahara | | G06Q 30/06 707/752 |
| 2016/0253326 A1 * | 9/2016 | Langseth | | G06F 17/30893 707/723 |

OTHER PUBLICATIONS stackoverflow.com, "MySQL-Performance when ordering on calculated column", Mar. 9, 2013 (https://stackoverflow.com/questions/15296321/mysql-performance-when-ordering-on-calculated-column) (Year: 2013).*

* cited by examiner

Primary Examiner — Naeem U Haq
Assistant Examiner — Norman Donald Sutch, Jr.
(74) Attorney, Agent, or Firm — Kilpatrick Townsend & Stockton LLP

(57) ABSTRACT

Techniques for ordering data associated with an item may be provided. For example, a first set of the data may be ordered based on predefined values of a first attribute. Based on receiving a request to further order the first set based on a second attribute, a second set of the data may be selected based on the first set and on a sizing window. The sizing window may be configured to define a size of the second set. Values corresponding to the data in the second set may be computed. These computed values may be used to order the second set of data.

22 Claims, 13 Drawing Sheets

ORDERING A SET OF DATA ASSOCIATED WITH AN ITEM

BACKGROUND

More and more users are turning to network-based resources to obtain information about an item. For example, a network-based resource may provide an electronic marketplace accessible to users to purchase items. Such a network-based resource may provide a user experience unmatched by a more traditional brick and mortar store. Typically, the network-based resource may offer a larger and more diverse selection of items. Further, for some of the items, there may be a number of sellers with different offers. As such, a consumer may not only obtain items from an available rich selection, but may also obtain the items at preferred offers.

Information available at a network-based resource may be provided from multiple information sources. For example and in the context of providing an electronic marketplace, a seller may operate a computing device to access the network-based resource and list items with different offers as available for ordering from the network-based resource. A customer may similarly operate a computing device to access the network-based resource, search for available items, get related descriptions, and purchase one or more items accordingly.

BRIEF DESCRIPTION OF THE DRAWINGS

Various embodiments in accordance with the present disclosure will be described with reference to the drawings, in which.

DETAILED DESCRIPTION

Figure 1:
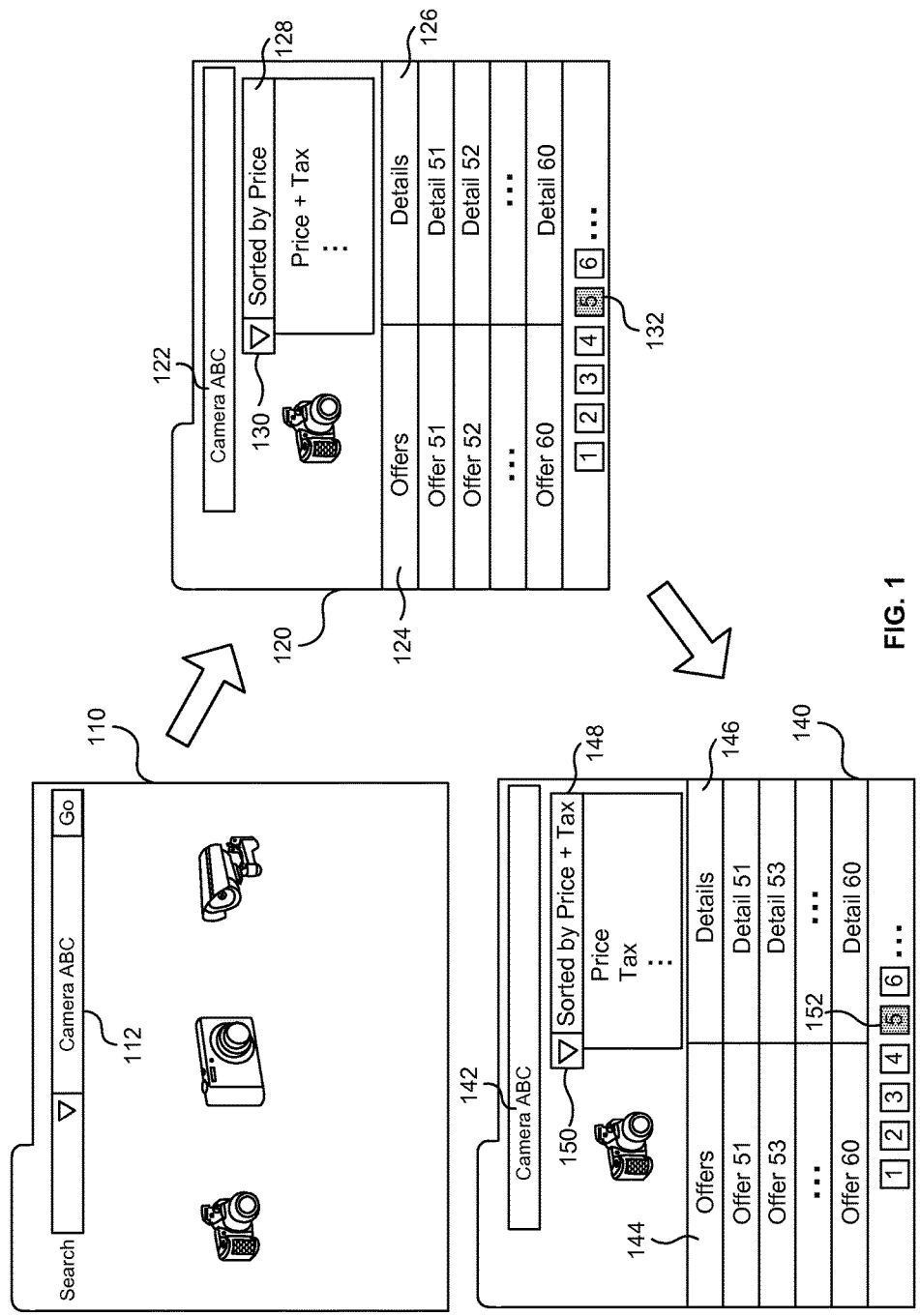
FIG. 1 illustrates an example interface for providing information associated with an item, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, ordering data (e.g., sorting, grouping, etc.) and providing information associated with an item. In particular, a network-based resource may have access to data associated with an item. Upon a request received from a computing device of a user for information about the item, a set of the data may be provided to the computing device for presentation. The presented data may be ordered based on an attribute having predefined values. In addition, an option for further data ordering may be provided. This further ordering may be based on another attribute, or a combination of attributes, for which values may need to be computed. If such an option is selected, a second set of the data may be selected based on the first set and a sizing window. The sizing window may limit the size of the second set such that the values of the other attribute need not be computed for all the data. The second set of the data may be ordered based on the computed values and provided for presentation to the computed device accordingly.

To illustrate, consider an example of a network-based resource associated with an electronic marketplace. A potential customer may operate a computing device to remotely access the network-based research and search for a particular item. In turn, the network-based resource may access offers available from the electronic marketplace and may provide a list of the offers to the computing device. Each of the offers may have a predefined price, which may allow sorting the presented offer list based on the various prices. The network-based resource may also provide an option to sort the offers based on a combination of price and tax. In contrast to the price, values of the tax may not be predefined. That may be because these values may depend on parameters that may be variable and unknown until after the customer accesses the electronic marketplace, such as the customer's location, status, and other related parameters. Computing the tax values for all of the offers may use a large amount of computing resource, be time consuming, result in latency for presenting the sorted offers list and, thus, may affect the user experience. Instead, a sizing window may be used to limit the number of the offers for which the tax may be calculated. For example, the sizing window may set a fixed or adjustable number of offers, where these offers may be based on the currently presented offers in the list. As such, if there were five thousand available offers, and if the presented list showed offers fifty-one through-sixty (e.g., ten total offers), the sizing window may indicate that it may be sufficient to compute the taxes for offers twenty-six through seventy-five (e.g., fifty total offers that may include the ten presented offers in the list). Thus, rather than computing the taxes for five thousand offers, it may be sufficient to compute the taxes for fifty offers, which may reduce the computing resource usage and latency by two orders of magnitude. Once the taxes for the fifty offers are computed, the presented list of offers may be reordered and organized to sort the ten best price-plus-tax offers.

In the interest of clarity of explanation, the various embodiments may be described herein in the context of sorting data. However, the embodiments are not to be limited as such. Instead, the embodiments may similarly apply to other types of ordering data. Ordering data may represent organizing the data in a certain order based on values associated with the data. For example, ordering may include sorting, grouping, clustering, filtering, and/or other types of data organization schemes.

Further and in the interest of clarity of explanation, the various embodiments may be described herein using offers, prices, and taxes associated with an item. However, the embodiments are not to be limited as such. Instead, the embodiments may similarly apply to providing information about an item based on sorted data associated with the item. The information may not be limited to information for facilitating a decision for purchasing the item. Instead, the information may be related to any aspect of the item. The data may not be limited to offers. Instead, the data may be any sortable data associated with the item (e.g., data that may have some structure to allow sorting). Further, the item may be tangible (e.g., a camera, a digital music record) or intangible (e.g., a service).

More particularly, the data may be sorted according to different attributes. Some of the attributes (e.g., price, flat rate shipping, etc.) may have predefined values. Such attributes may be referred to herein as predefined attributes. The corresponding values may be referred to as predefined values. The sorting according to such predefined attributes may not require additional computation of the predefined values. However, other attributes (e.g., tax, variable shipping rate, seller ratings, etc.) may not have predefined values. Instead, values of these attributes may not be computed until additional information about the item, a user, and/or an item provider becomes available. Such attributes may be referred to herein as on-the-go attributes. The corresponding values may be referred to as on-the-go values. In such a case, the on-the-go values may not be computed until after receiving a request for a sort using the one or more on-the-go attributes. Once computed, the on-the-go values may be used to sort the data according to the one or more on-the-go attributes.

As such, sorting the data may use one of or a combination of predefined and on-the-go attributes. Because values of an on-the-go attribute may not be predefined and may need to be computed, a sizing window may be used to limit the amount of the data for which the values may be computed. Thus, the sizing window may improve the efficiency of the computation and data sorting by reducing computing resource usage and latency. In particular, the sizing window may be configured to define the amount (or size) of the data. This defined amount may be less than the total amount of the data. For example, when the data includes elements, records and/or results (collectively, "elements") sorted in an order (e.g., when the data corresponds to an ordered set) the sizing window may define an interval and/or list (collectively, "interval") of the ordered elements such that the number of elements in the interval corresponds to the size of the sizing window. Further, the definition (or selection) of this amount may be based on a likelihood of retaining pertinent data and computing associated values relevant to sorting the data. These and other features are further described in the next figures. Again, in the interest of clarity of explanation, example offers, prices, and taxes may be used without limiting the present embodiments.

Although, predefined attributes and on-the-go attributes are described, the embodiments herein may similarly apply to other types of attributes. For example, low and high latency attributes may be used in place of or in conjunction with predefined and on-the-go attributes, respectively. A low latency attribute may have values that, when computed, may result in low latency. In contrast, a high latency attribute may have values that, when computed, may result in high latency or high latency, respectively. In another example, small and high computational attributes may be used. A small computational attribute may have values that, when computed, may use a small amount of computational resources. In contrast, a large computational attribute may have values that, when computed, may use a large amount of computational resources.

In addition, the embodiments may apply to multiple levels of data ordering. For example, sorting data may be performed at N-levels, where "N" may represent an integer greater than two. At each level, the sorting may consider a particular attribute and apply a sizing window to sort the data based on values of the attribute. To illustrate, consider the example of offers where sorting may be performed at three levels, each corresponding to one of the following attributes: price, tax, and delivery speed. At a first level (e.g., price), a sizing window may be set to be equal to a size of a page view (e.g., the number of offers that may be listed per page). The offers displayed on a page view may have been sorted based on the price (e.g., in an ascending order of the price values). At a second level (e.g., tax), a sizing window may be set and used to compute tax values for offers including the ones displayed on the page view. That page view may be updated to display the number of offers sorted by price and tax (or tax only). At a third level (e.g., delivery speed), a sizing window may also be set and used to compute delivery costs for offers including the ones displayed in the updated page view. Here again, the page view may be further updated to display the number of offers sorted by price, tax, and delivery speed (or any combination of these attributes that may contain the delivery speed).

In the interest of clarity of explanation, the various embodiments may also be described herein in connections with different types of sizing windows. Although the sizing windows may be described as two-dimensional, embodiments are not to be limited as such. Instead, the embodiments may similarly apply to higher multi-dimensional sizing window or to a one-dimensional sizing window. A multi-dimensional sizing window configured to facilitate ordering the data based on a plurality of attributes. To illustrate, and referring to the example of sorting offers based on price, tax, and delivery speed, one dimensional, two dimensional, or three dimensional sizing windows may be used. In particular, when sorting by price values, a one-dimensional sizing window may be used. This sizing window may only consider offers. In comparison, to further sort the price-sorted offers based on the tax, a two-dimensional sizing window may be used. This sizing window may consider offers and price values. At a third level, to sort based on additionally the delivery speed, a three dimensional sizing window may be used. This sizing window may consider offers, price values, and tax values. Additionally or alternatively to the three dimensional sizing window, a combination of lower dimensional sizing windows may be used. For example, one sizing window may consider offers and price values and another sizing window may consider offers and tax values.

In addition, when data is ordered (e.g. sorted), the corresponding order may be persisted (e.g., saved temporarily or permanently). Whether an order based on an attribute should be persisted may depend on a number of factors. In one example, some or all of the factors may be based on the attribute itself. For instance, a factor may represent the variability of the values of that attribute. The less frequently the values may change (e.g., in comparison to other attributes), the more likely the corresponding order may be persisted. Persisting ordered data may enable a number of functions. For example, the saved order may be provided as input to a subsequent (e.g., further) ordering of some or all of the data. In other words, a saved order associated with one level may be used as input to a next ordering level. In another example, if the saved order corresponds to an attribute having values that may change infrequently (e.g., having a lower or no variation in comparison to values of other attributes), the saved order may be reused again instead of performing an actual ordering based on that attribute. In other words, in response to a request for ordering data based on a low-varying attribute, a corresponding saved order may be used if one exists.

Turning to FIG. 1, an example of an interface for presenting information about an item is illustrated. In particular, the interface may include a number of web pages for searching and presenting offers from, for example, an electronic marketplace. An offer may represent a listing of an item available for ordering from the electronic marketplace according to a number of attributes. Some of the attributes may be offer-related, such as price, tax, delivery method. Other attributes may be item-related, such as technical features of the item. Yet some other attributes may be customer-related (e.g., customer reviews) or provider-related (e.g., provider reviews, provider ratings, customer membership associated with the provider, etc.) The presented offers may be sortable based on a number of attributes including predefined and on-the-go attributes, such as price and tax, respectively. A web page may be an example of a network-based document that may be provided by a network-based resource associated with the electronic marketplace. Further, a web page may be presented at a user interface of computing device remotely connecting to the network-based resource. Example computing environments including a network-based resource, an electronic marketplace, and computing devices for implementing and providing the illustrated interface are further shown in FIGS. 11-13.

In an example, a web page 110 may provide a search field 112 to search for an item. Based on input to the search field 112, a request for offers (and/or other information) about the item may be generated. Based on the request, available offers may be determined. Some or all of these offers (and/or other data) may be presented at web pages 120 and 140.

The web page 120 may identify the item in a title field and may organize the presentation of the available offers in multiple page views 132. Each of the page views 132 may represent a presentation page that may limit the number of presented offers to a certain number per page (e.g., ten or some other number that may depend on the computing device presenting the web page 120). As such, the first page view may present the first ten offers, the next page view may present the next ten offers, and so on and so forth. Presenting the offers may use a list (or any other format, such as tiles) to identify the presented offers 124 and the corresponding details 126. In addition, the presented offers may be sorted based on an attribute, such as price. The type of sorting may be identified in a sort field 128. In an example, the sorting may be defaulted to using a predefined attribute (or a combination of predefined attributes) such as the price. That may be because the associated values (e.g., the actual prices corresponding to the presented offers) may be predefined and, thus, may not need additional computation. However, the sorting may not be limited as such. Instead, an option 130 may be also provided and presented for sorting according to another attribute (or a combination of attributes). As illustrated in FIG. 1, this option 130 may take the form of a drop-down menu, although other formats may be used (e.g., a check box). The option 130 may allow the selection of a sort based on an on-the-go attribute (e.g., tax), a combination of predefined and on-the-go attributes (e.g., price plus tax), or other combination of a plurality of attributes.

As illustrated in FIG. 1, a selection of the option 130 for a sort based on a combination of a predefined attribute and on-the-go attribute (e.g., price plus tax) may be made. This selection may result in computing values corresponding to the on-the-go attribute and sorting the offers based on this computation. The web page 120 may then be refreshed to show the offers sorted based on the combination (e.g., price plus tax). The refreshed web page 120 is illustrated as the web page 140 in FIG. 1.

The web page 140 may use a similar format for presenting the sorted offers according to the combination. In particular, the web page 140 may identify the page views 152, list the presented offers 144 and the respective details 146, identify the type of sorting in a sort field 148, and provide an option 150 for another type of sorting. As illustrated in FIG. 1, the web pages 140 and 120 may present offers corresponding to a same page view (e.g., page view 5). However, the sort order of the presented offers 124 and 144 (and the respective details) may be different. The reasons for the difference and change are further described in the next figures. As illustrated in FIG. 1, an offer "fifty-two" may be shown as second in the list of the presented offers 124 at the web page 120. However, this offer may be replaced with an offer "fifty-three" in the list of the presented offers 144 at the web page 140.

Hence, by providing the interface of FIG. 1, a user may be able to sort data associated with an item based on a number of attributes. Some of these attributes may have predefined values, but other attributes may not. Accordingly, computation of values associated with an on-the-go attribute may not be performed until, for example, a request may be submitted for a sort that may use this attribute (e.g., a selection of the option 130). In this way, these values may be computed on a per-need or on-demand basis and, thus, may avoid any unnecessary computations that may result in an improved usage of underlying computing resources.

Figure 2:
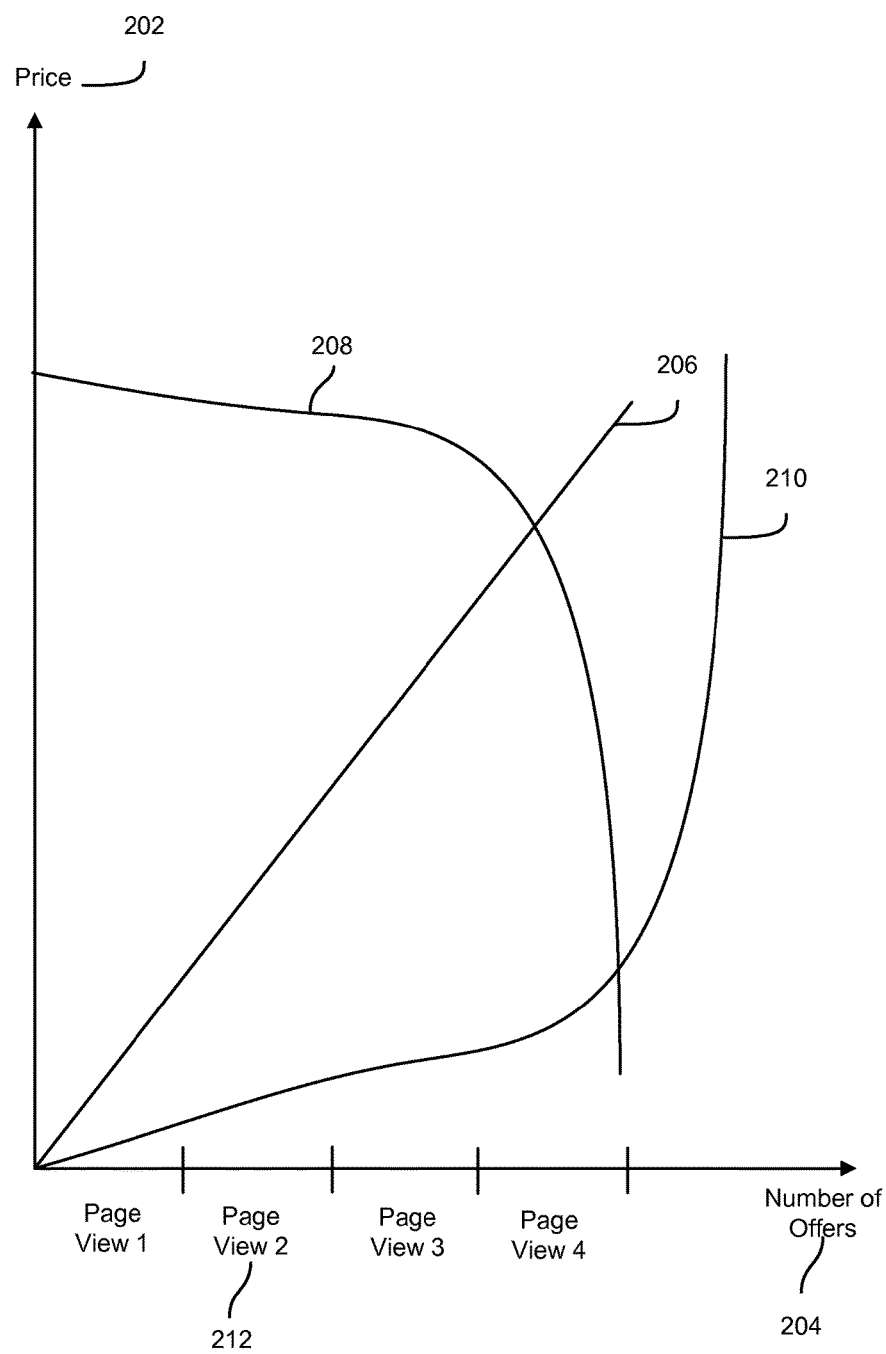
FIG. 2 illustrates an example attribute usable to sort data about an item, according to embodiments.

Turning to FIG. 2, the figure illustrates an example of variations in the size of data, such as the number of offers available for an item. By monitoring such variations, a selection of a sizing window may be made, as further described in connection with the next figures.

As illustrated in FIG. 2, the price of an item may be tracked on the vertical axis 202 and the number of offers may be tracked on the horizontal axis 204. Other types of tracking may be used (e.g., price on the horizontal axis and number of offers on the vertical axis). Three example curves 206-210 are also illustrated, each of which shows how the number of offers for the item may vary with the price. Although FIG. 2 illustrates data for a single item, similar data may be generated and used for a category of items. A category of item (e.g., item category) may represent an association between items that may share a number of common features. For example, two digital single-lens reflex (DSLR) cameras from two manufacturers may belong to a same category of DSLR cameras. Similarly, a DSLR camera and a point and shoot camera may belong to a same, broader category of cameras.

The curve 206 may represent a linear association between the price and the number of offers. The lower the price may be, the lower the number of offers may proportionally be. In comparison, the curves 208 and 210 may represent non-linear associations. As shown with the curve 208, the higher the price may be, the lower the number of offers may be.

That may be because sellers may tend to compete with lower priced offers. In contrast, the curve 210 may reflect that the higher the price may be, the higher the number of offers may also be. That may be because, in certain situations, only a few sellers may offer the item at lower prices, unlike most of the sellers having higher prices.

Which of the three curves 206-210, or any other similarly tracked curve, actually applies for the item (or item category) may indicate how the prices may vary per page view. This indication may be used in selecting the sizing window. In particular and as illustrated in FIG. 2, the number of offers may be segmented based on the number of offers to be presented per page view 212. For example, if ten offers (or any other number) are to be shown in a page view, the horizontal axis 204 may be divided in increments of ten offers. Each increment may be associated with a page view, may correspond to ten offers, and may be used to present the respective prices in the page view.

The linear curve 206 may indicate a linear variation between prices of offers belonging to a same page view. In comparison and within a particular page view, the non-linear curve 208 may indicate a small variation at high prices and large variation at low prices. The non-linear curve 210 may indicate an inverse of this non-linear variation. In particular, the non-linear curve 210 may show a small variation at low prices and a large variation at high prices. This variation within a page view may be used as one of the factors to select the sizing window. For example, an adjustable sizing window may be used when large variation may be observed. Other factors may also include the total number of offers as further described in the next figures.

Figure 3:
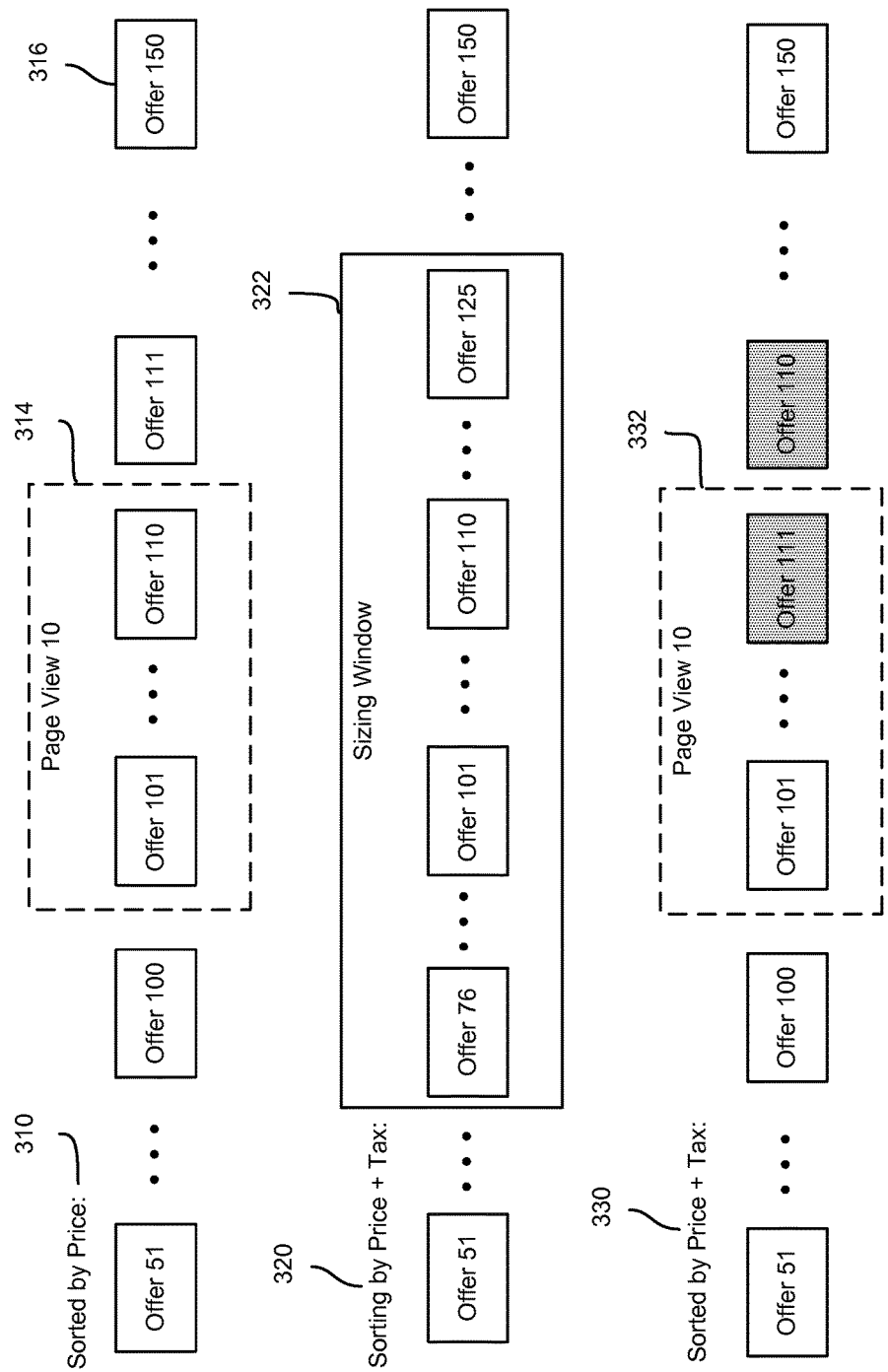
FIG. 3 illustrates an example of data sorting based on a sizing window, according to embodiments.
Figure 4:
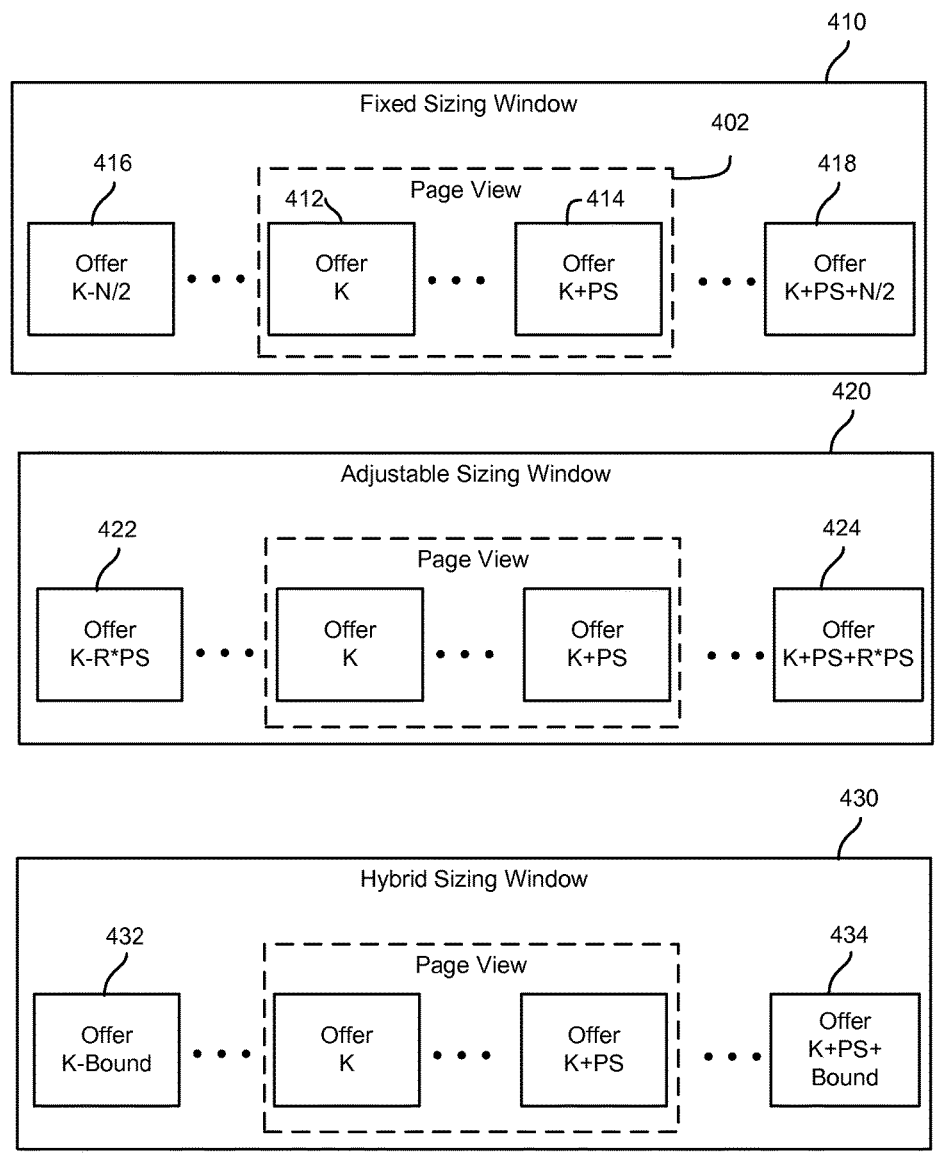
FIG. 4 illustrates example sizing windows, according to embodiments.

As described hereinabove, to compute values of an on-the-go attribute (e.g., values of tax on an item), a sizing window may be used to limit the amount of data (e.g., offers) for which the values may need to be computed. FIG. 3 illustrates an example of using a sizing window to limit the data amount. In comparison, FIG. 4 illustrates available types of a sizing window.

As illustrated in FIG. 3, offers may be sorted based on a predefined attribute, such as being sorted by price 310. Upon a request for sorting that may, at least in part, use an on-the-go attribute, the offers may be further sorted. FIG. 3 illustrates a request for sorting 320 based on a combination of tax, as the on-the-go attribute, and the price. However, the embodiments described herein may not be limited as such. Instead, the request and/or the sorting may be similarly based on an on-the-go attribute only or other combinations of attributes. Once the sorting 320 is complete, the offers may be sorted according to the request, such as by price and tax 330.

In particular, the offers sorted by price 310 may include a large number of offers that exceed the presentable number of offers per page view (e.g., five thousand or more offers, compared to ten presentable offers per page view). FIG. 3 illustrates an example of a particular page view 314 showing a first set of these offers. In this example, the page view 314 may correspond to the tenth page view and may be used to present offers "one hundred and one" through "one hundred and ten." These offers may be listed in an ascending order. In other words, offer "one hundred ten" may have a higher price than offer "ninety-nine" and higher than offer "one hundred two," and so on and so forth. Of course, the embodiments described herein may not be limited to this ascending order only and may, instead, be similarly applied to other listing orders.

When sorting 320 may be performed, a balance between usage of computing resource, latency, accuracy, and/or user experience may be considered. On one hand, the tax values for all offers (e.g., the five thousand offers) may be computed. Although this computation may lead to the most accurate result, it may nonetheless use too much computing resources and result in latency and degraded user experience. For example, assuming that computing the value of tax per offer uses a call to a computing service and consumes 0.01 seconds of computational time, computing all the tax values would use five thousand calls and up to fifty seconds to complete. This may translate in at least a fifty second delay between the time a user requests a tax sort and the time the sorted orders are displayed. On the other hand, the tax values for only the offers of the first set (e.g., within the page view 314 with the ten currently presented offers) may be computed and used to sort based on the price plus tax. Although this approach may substantially reduce computing resource usage and latency, it may be inaccurate and also result in a degraded user experience. That may be because some of the tax values on some of the offers not in the first set may be low. For example, the offer "one hundred and eleven" (not in the first set and, thus, not presented in the page view 314) may have a lower tax value than the offer "one-hundred and ten" (in the first set and, thus, presented in the page view 314), such that the combination of price and tax for the "one-hundred and eleven" offer may be lower than that of the "one-hundred and ten" offer. Thus, by not considering the "one-hundred and eleven offer," this offer may be inaccurately sorted out, resulting in the user not receiving an accurate sort.

By using a sizing window 322 to perform the sorting 320, a balance between computing resource usage, latency, accuracy, and/or user experience may be achieved. The sizing window 322 may consider a second set of the offers. This second set may be based on the first set. For example, the second set may include all the offers from the first set. To reduce computing resource usage and latency, the second set may not include all five thousand offers. To meet accuracy and user experience requirements or preferences, the second set may expand the first set to include neighboring offers. The number and the selection of the neighboring offers may depend on a number of factors, including the type of the sizing window as further described in the next figures. As illustrated in FIG. 3, the sizing window 322 may define the size of the second set to fifty elements (e.g., offers). As such, the second set may include, in addition to the ten offers of the first set, forty additional offers. FIG. 3 illustrates this expansion by showing the second set as including offers "seventy-six" through "one hundred and twenty-five." In this example, the computation of the respective tax value may use fifty calls and 0.5 seconds and may provide acceptably accurate results.

The sorting 320 may include computing the tax values for all the offers within the second set, adding the computed tax values to the respective prices, and ordering (e.g., in an ascending order or in other listing order) the offers in the second set based on the combination of (e.g., the addition of) price and tax. As illustrated in FIG. 3, the page view 314 may be refreshed and may become the page view 332 to present the offers sorted by price and tax 330. Continuing with the previous example, because the price and tax of the offer "one hundred and eleven" may be lower than that of the offer "one hundred and ten" the page view 332 may present the offer "one hundred and eleven" but not the offer "one hundred and ten." Other rearrangements and shuffling of offers may also occur as further described in the next figures.

FIG. 4 illustrates examples of sizing windows. In particular, a fixed sizing window 410, and adjustable sizing window 420, and a hybrid sizing windows 430 are shown. Each of these sizing windows may be configured to define a size of a set of data (e.g., offers) for which values of an on-the-go attribute (e.g., tax) may be computed. This set of data may be based on another set of data for which values of a predefined attribute (e.g., price) may be known. For example, the set defined, at least in part, by the sizing window may represent an expansion of the other set. This expansion may be limited to the size defined by the sizing window.

In the interest of clarity of explanation, the following notations may be used. A page view 402 may be associated with a page size (abbreviated in the figures as "PS"). The page size may limit the number of offers presentable in the page view 402. For example, a page size of ten may indicate that ten offers may be presented in the page view 402. As such, the page view 402 may correspond to a first set of offers having a size defined by the page size. As illustrated in FIG. 4, the first offer 412 in that set may be labeled as offer "K," and the last offer 414 in that first set may be labeled "K+PS." In other words, the first set of the offers presented in the page view 402 may include {Offer K; Offer K+1; . . . ; Offer K+PS}. When other data, or in addition to, offers is used, similar notations and definitions may also be used.

The fixed sizing window 410 may define a fixed size "N" of a second set. The second set may expand the first second based on the fixed size "N." Computation and definition of the fixed size "N" is further described in the next figures. As illustrated in FIG. 4, the second set may start at offer "K−N/2" (shown as offer 416), end at offer "K+N/2" (shown as offer 418), and may include the offers of the first set. In other words, the second set may include {Offer K−N/2; Offer K−N/2+1; . . . ; Offer K; Offer K+1; . . . ; Offer K+PS; Offer K+PS+1; . . . ; Offer K+PS+N/2}. Other configurations of the second set based on the fixed size "N" may be used. For example, the second set may not be centered on the first set. In another example, the first offer 416 and/or the last offer 418 may correspond to some other fraction of N (e.g., N/3). In a particular example, if the page view 402 may represent the first page view, the first offer 416 of the second set may correspond to the first offer 412 of the first set, whereas the last offer 418 of the first set may correspond to offer "K+PS+N/2" or "K+PS+N." Similarly, if the page view 402 may represent the last page view, the last offer 418 of the second set may correspond to the last offer of the first set, whereas the first offer of the first set may use an offset of "N/2" or "N."

In comparison to the sizing window 410, the adjustable sizing window 420 may define an adjustable size. The adjustable size may vary based on the first set, the total number of offers, the item category, or other factors as further described in the next figures.

In an example, the adjustable sizing window may define a limiting factor "R." The limiting factor "R" may represent a multiplier that may be used to adjust the size of the second set based on any of these factors. For instance, the multiplier may represent an expansion percentage (e.g., ten percent or some other number) relative to the size of the first set, an expansion percentage based on prices (or any other predefined attribute) from the first set or the total number of offers, a fraction of the total number offers, or a variable expansion percentage or variable fraction based on a location on a tracked curve (e.g., the curves 206-210 and the relative page view 212 of FIG. 2). Each of these multipliers may be defined for the item or for the item category.

The first offer 422 and the last offer 424 in the second set may be based on the limiting factor "R" and the offers from the first set. For example, the first offer 422 may correspond to offer "K−R*PS," where "R*PS" may represent an application (e.g., multiplication) of the limiting factor "R" to the page size of the page view 402. Similarly, the offer 424 may correspond to offer "K+PS+R*PS."

For example, the limiting factor "R" may be applied to one or more offers from the first set. The offer with the highest price may be selected (or any other value of a predefined attribute). The limiting factor "R" may then be applied to (e.g., multiplied with) this predefined value (e.g., the highest price), to compute an offset value. The second set may be sized based on the offset value.

In a particular illustration, the limiting factor "R" may represent the maximum tax rate (e.g., 10%) seen across an item category. In this illustration, assume the offers are sorted by price. Thus, the first offer 412 may have the lowest price of offers from the first set. Conversely, the last offer 414 may have the highest price of offers from the first set. Further, assume that these prices may be $10 and $20, respectively. By multiplying the highest tax rate with the highest price, an offset value may be derived (e.g., $2=10%× $20). A price range based on this offset value may be defined. For example, the lower end of the range may be equal to the lowest price minus the offset value and the upper end of the range may be equal to the highest price plus the offset value. Thus, the second set may include all the offers that may have prices in the range of $8 to $22.

In comparison, the hybrid sizing window 430 may combine some elements of the fixed sizing window 410 and of the adjustable sizing window 420. For example, the hybrid sizing window 430 may use an adjustable size that may fixed by a lower bound and an upper bound. In other words, an adjustable size may be computed by using a limiting factor "R." In addition, a lower bound and an upper bound may be defined as fixed bounds (e.g., minimum and maximum number of offers for which on-the-go values may be computed). As long as the adjustable size falls within a range defined by the lower and upper bounds, the second set may include the respective offers. However, if the adjustable size violates any of the bounds, the second set may be capped or limited based on the violated bound. As illustrated in FIG. 4, the second set may start at offer "K−bound" (shown as offer 432), may end at offer "K+PS+bound" (shown as offer 434) and may include the offers of the first set, where the bound may represent the upper or lower bound. In other words, the second set may include {Offer K−bound; Offer K−bound+1; . . . ; Offer K; Offer K+1; . . . ; Offer K+PS; Offer K+PS+1; . . . ; Offer K+PS+bound}.

To illustrate, consider an example where the lower bound and upper bounds may be ten and fifty offers, respectively. If the computed size falls between these two bounds (e.g., twenty-five), the second set may include offers according to that size (e.g., twenty-five offers). However, if the computed size exceeds the upper bound, the second set may include only fifty offers as defined by the upper bound. Similarly, if the computed size is lower than the lower bound, the second set may be expanded to include at least ten offers as defined by the lower bound.

The various sizing window types may provide different features that may be considered in selecting the type to be implemented. For example, the fixed sizing window 410 may allow for predictability in computing resource usage and latency. To illustrate, if latency is to be kept at less than 0.5 seconds based on computing values of an on-the-go attribute and if computing each value uses a 0.1 second call to a computing service, the fixed size may be set to fifty offers to meet and observe such latency. Thus, each time a request to sort based on-the-go attribute may be received, a total of fifty calls and 0.5 second latency may be expected. In comparison, the adjustable sizing window 420 may allow for accuracy by considering a more complete number of offer or more relevant offers for inclusion in the second set. The hybrid sizing window 430 may provide a balance between computing resource usage and latency on one hand and accuracy on the other hand.

Figure 5:
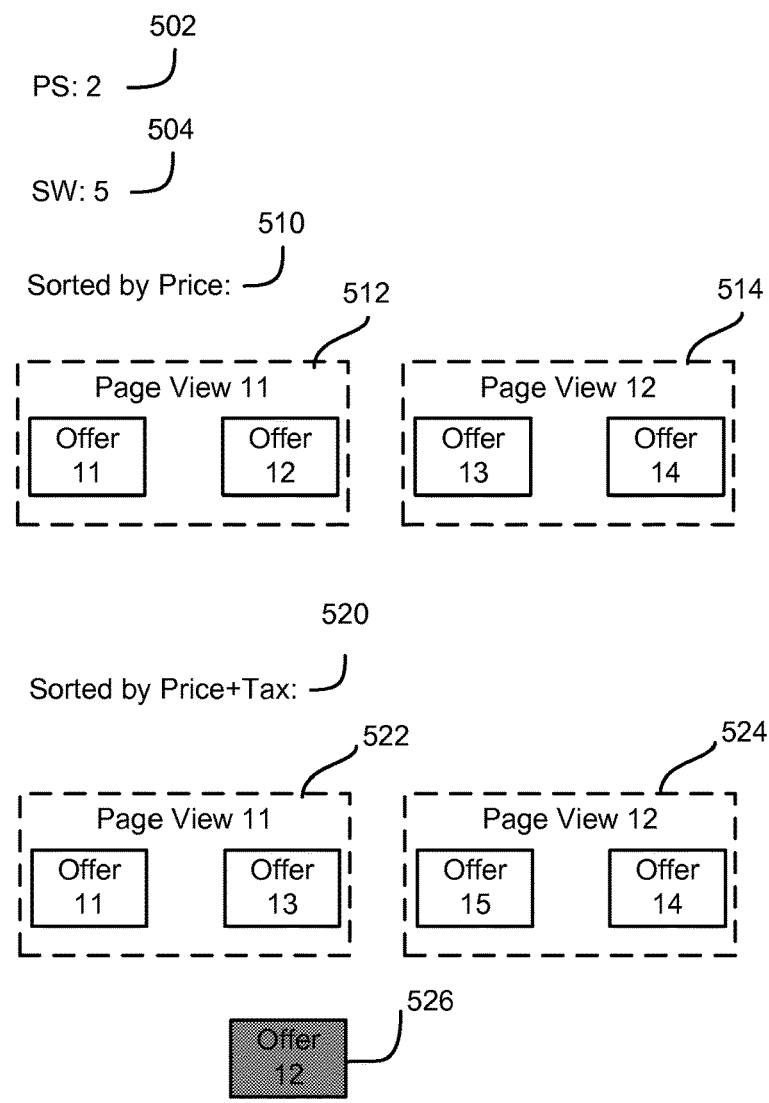
FIG. 5 illustrates an example of applying a sizing window to multiple presentation pages, according to embodiments.

Turning to FIG. 5, the figure illustrates an example to applying a sizing window to multiple page views. In particular, an example is shown of an offer being dropped off from sorting offers based on an on-the go attribute. Dropping off an offer may represent an offer being removed from presentation in page views when the sizing window is applied across these page views, such that the offer may not be presented in any of the page views. That may be the case when, for example, applying the sizing window results in a particular sorting order and the page size of the page views removes the offer from presentation. This dropping off may be a factor considered in selecting or setting a sizing window as further defined in the next figures.

In the interest of clarity of explanation, a page size 502 of two, a sizing window 504 of five, a sorted by price 510 and a sorted by price and tax 520 are illustrated in FIG. 5. However, other sizes, types of sorting, and/or type of data and attributes may be similarly used.

As illustrated, the sorted by price 510 may list the offers in an ascending order based on the respective prices. The illustrated offer "eleven" may have a lower price than offer "twelve," which in turn may have a lower price than offer "thirteen," and so on and so forth. Each page view may limit the number of the presented offers based on the page size 502. As such, the eleventh page view 512 may present offers "eleven" and "twelve" the twelfth page view 514 may present the next two offers (e.g., offers "thirteen" and "fourteen") and so on and so forth.

As a part of sorting the offers based on price and tax, the tax values for the different offers may be computed. The tax rate of each of the offers may vary based on the offer, the respective seller, or other offer, user, or item-related variables. As such, the tax rates for two offers may be different. In other words, there may be situations where a lower-priced offer may have a higher tax rate than that of a higher-priced offer. Although the lower-priced offer may be sorted by price ahead of the higher-priced offer, the lower-priced offer may be more expensive when the combination of price and tax is considered. As such, when the sorting by the price and tax is complete, these two offers may be rearranged such that the higher-priced other offer may be sorted ahead of the lower-priced offer.

To sort the offers based on price and tax for presentation in the eleventh page view 512, the sizing window 504 is applied to five consecutive offers already sorted by price 510 and starting with offer "ten" and ending with offer "fourteen." Thus, the tax values of offers "ten" through "fourteen" may be computed and added to the respective prices. These five offers may then be sorted in an ascending order based on the respective price and tax values. Because the page size 502 is two, only the first two offers from the ascending order may be presented in a refreshed first page view (shown as page view 522). As illustrated in FIG. 5, offer "thirteen" and offer "twelve" may have been rearranged for the above reasons. Thus, the refreshed page view 522 may present offers "eleven" and "thirteen" but not offer "twelve."

To sort the offers based on price and tax for presentation in the twelfth page view 514, the sizing window 504 is applied to five consecutive offers already sorted by price 510 and starting with offer "twelve" and ending with offer "sixteen." Thus, the tax values of offers "twelve" through "sixteen" may be computed and added to the respective prices. Note that from the sorting of the previous page view, the tax values of offers "twelve" through "fourteen" may already have been computed. As such, these values may be re-used rather than computed again. The five offers "twelve" through "sixteen" may then be sorted in an ascending order based on the respective price and tax values. Because the page size 502 is two, only the first two offers from the ascending order may be presented in a refreshed first page view (shown as page view 524). As illustrated in FIG. 5, offer "thirteen" and offer "fifteen" may have been rearranged for the above reasons. Thus, the refreshed page view 522 may present offers "fifteen" and "fourteen" but not offer "thirteen."

This type of computation based on the sizing window may be repeated across the various page views. As illustrated, offers "twelve," "thirteen," and "fifteen" may have been reshuffled. For the purpose of illustration, assume that the reshuffling may result in offer "twelve" not being presented in any of the page views because of the respective high tax rate. In comparison, the reshuffling may result in offers "thirteen" and "fifteen" being presented in page views (e.g., offer "thirteen" in the eleventh page view 522 and offer "fifteen" in the twelfth page view 524). As such, the reshuffling may result in dropping off offer "twelve," but not offers "thirteen" and "fifteen." FIG. 5 shows this dropping off as a shaded offer 526.

To avoid this scenario of dropping off, the size defined by the sizing window 504 and/or the page size 502 may be changed (e.g., increased) such that offer "twelve" may be considered more frequently when the sorting by the price and tax is performed. This frequency increase may result in lowering the likelihood of dropping off this offer and, thus, may improve the accuracy of the sorting. In other words, by analyzing correlations between the size defined in a sizing window and/or a page size and the likelihood of drop off, a desired accuracy may be achieved by adjusting the sizes as needed.

Figure 6:
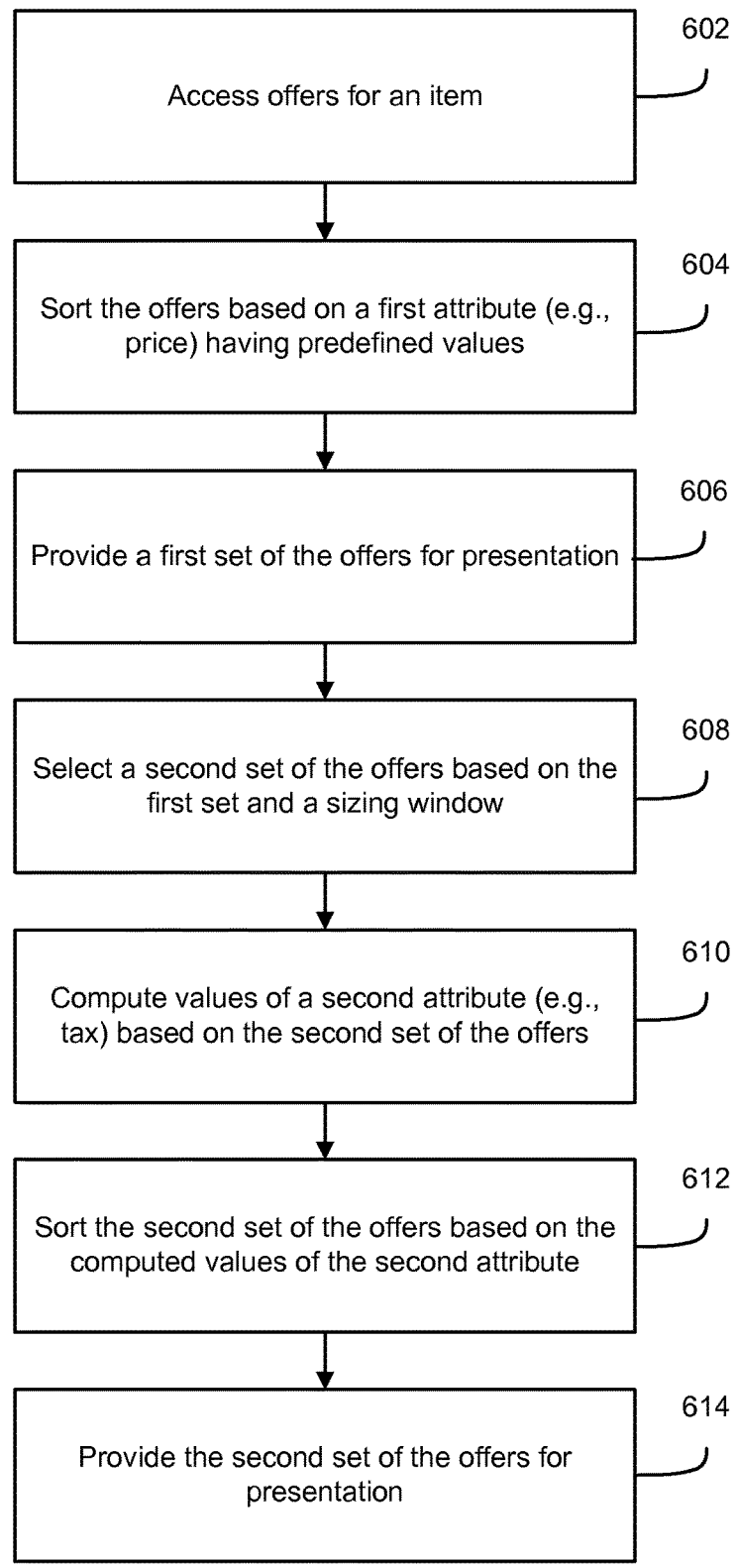
FIG. 6 illustrates an example flow for providing sorting data associated with an item, according to embodiments.
Figure 7:
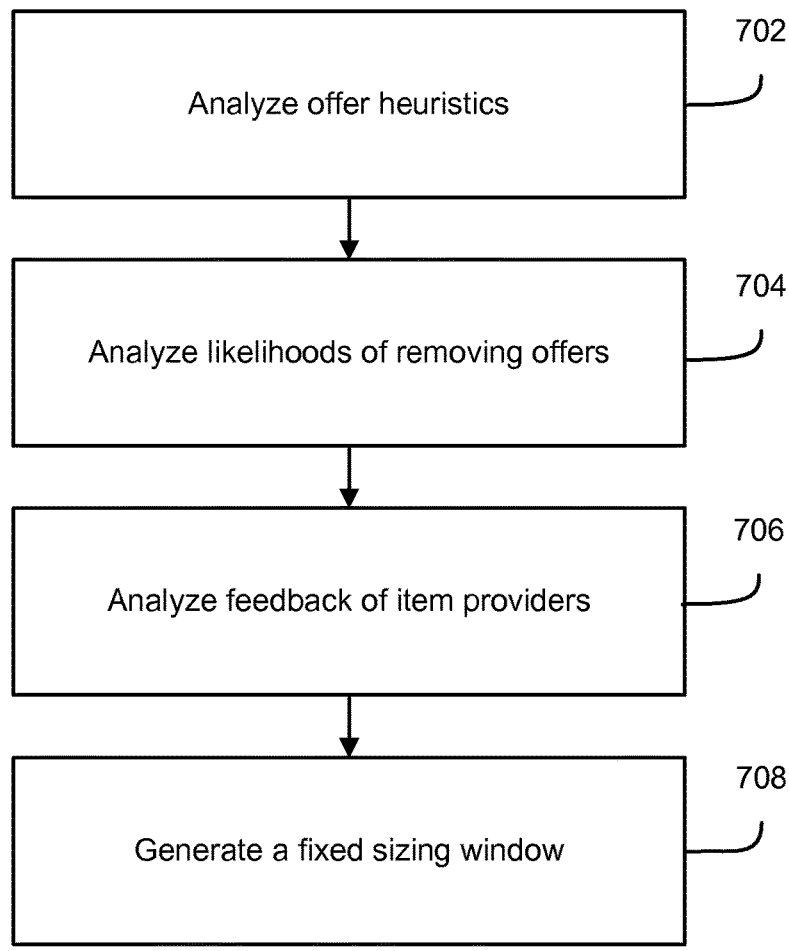
FIG. 7 illustrates an example flow for generating a fixed sizing window, according to embodiments.
Figure 8:
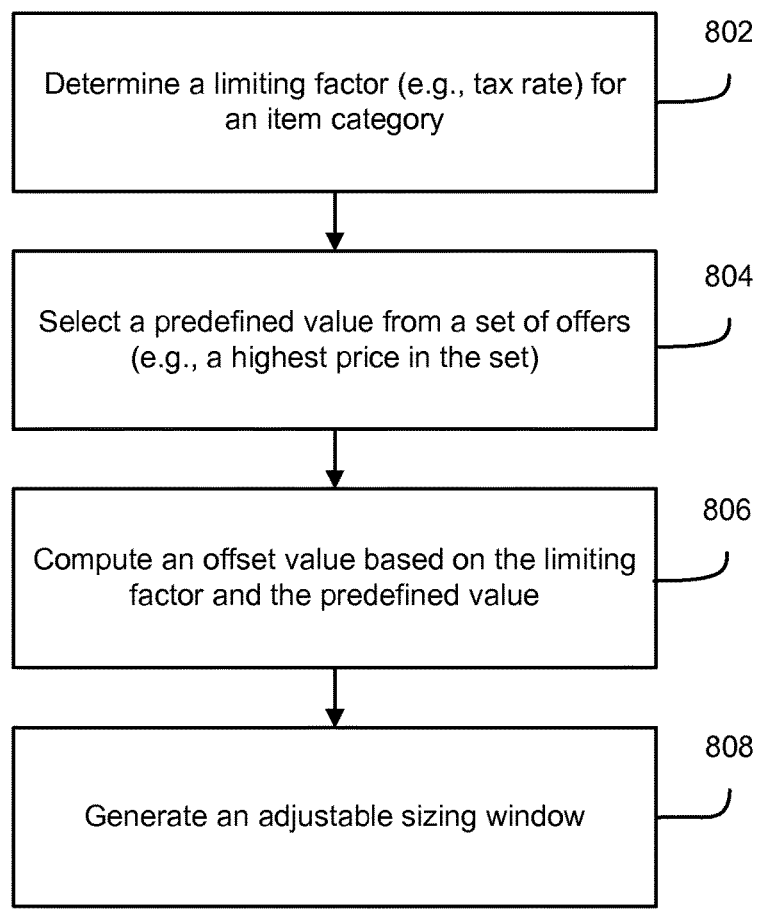
FIG. 8 illustrates an example flow for generating an adjustable sizing window, according to embodiments.
Figure 9:
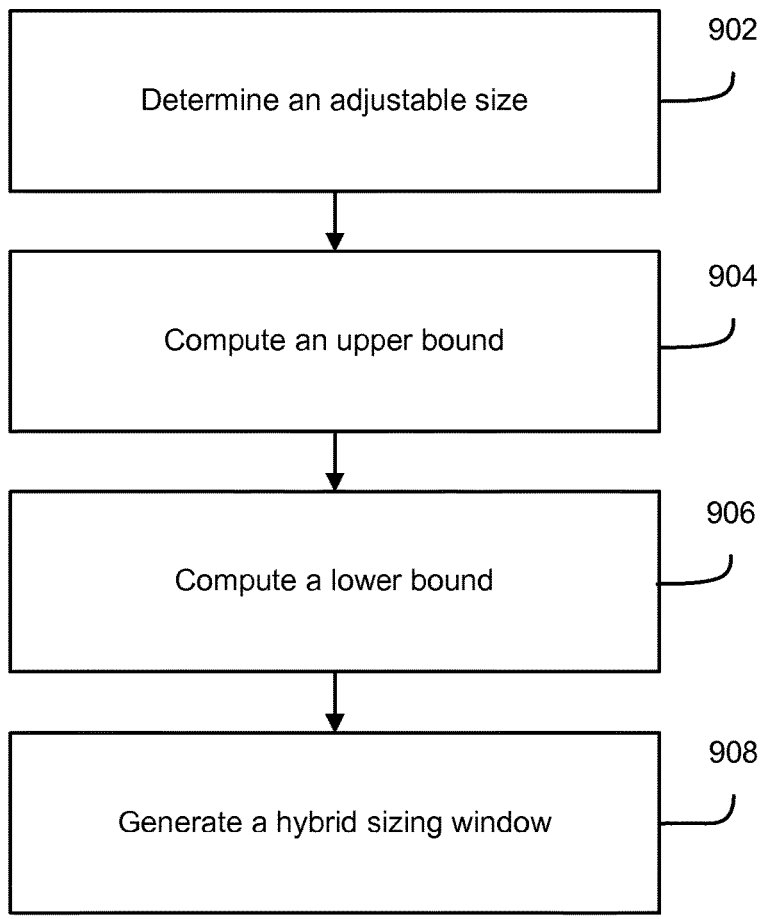
FIG. 9 illustrates an example flow for generating a hybrid sizing window, according to embodiments.
Figure 10:
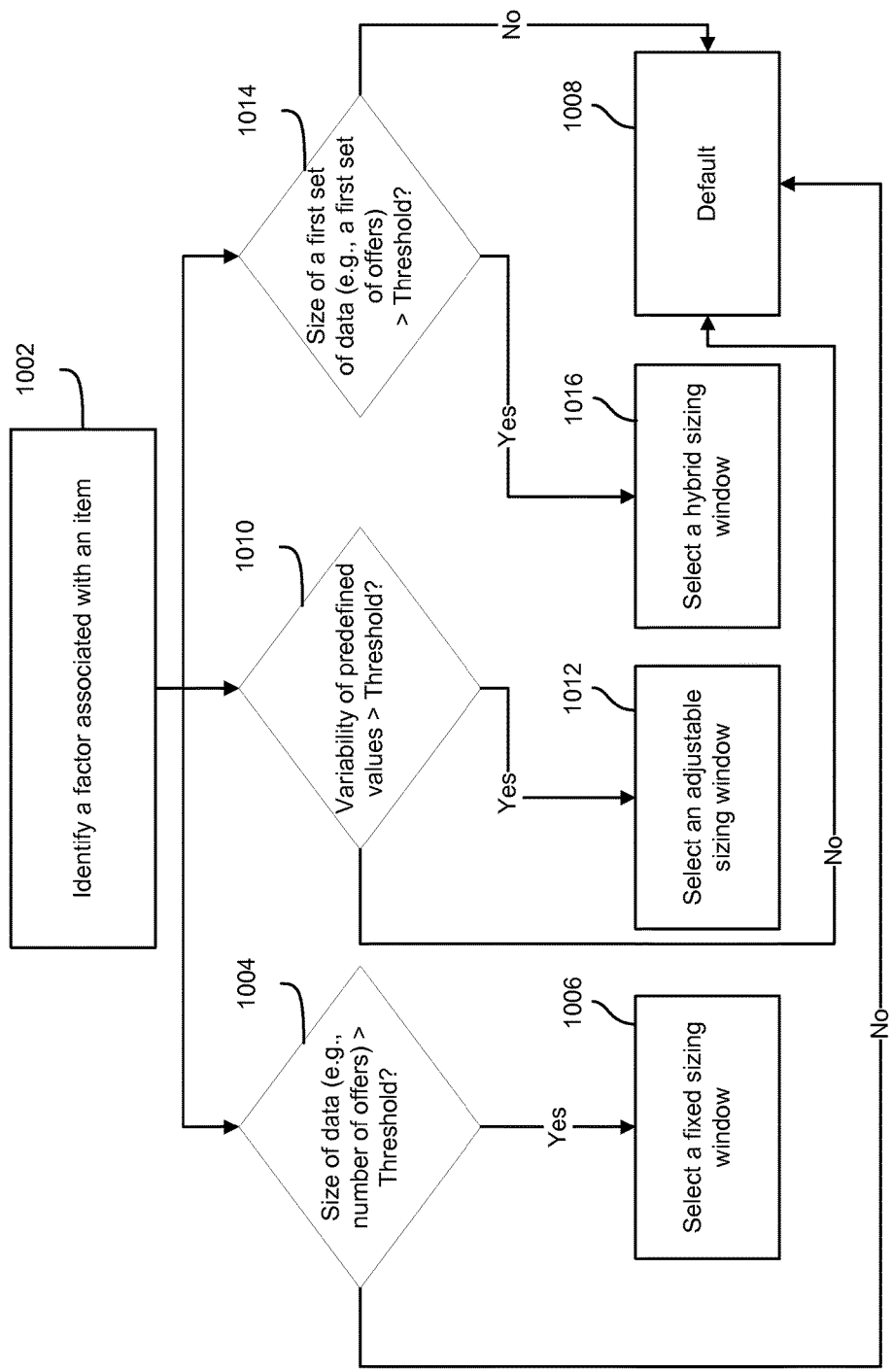
FIG. 10 illustrates an example flow selecting between sizing windows, according to embodiments.

Turning to FIGS. 6-10, the figures illustrate example flows related to sizing windows. In particular, FIG. 6 illustrates an example flow for using a sizing window to sort data associated with an item (e.g., offers). In comparison, FIGS. 7-9 illustrate example flows for defining fixed, adjustable, and hybrid sizing windows, respectively. FIG. 10 illustrates an example flow for selecting between the three sizing window types. Some operations across the example flows may be similar. Such similarities are not repeated herein in the interest of clarity of explanation. In addition, the example flows describe using a sizing window(s) in connection with sorting offers associated with an item based on price as a predefined attribute and tax as an on-the-go attribute. Nevertheless, the embodiments described herein are not limited as such. Instead, the example flows may similarly apply to other types of data and other combinations of attributes.

Further, in the illustrative operations, some of the operations or functions may be embodied in, and fully or partially automated by, modules executed by one or more processors. For example, a sorting service hosted on a computing resource may be configured to perform some of the operations. Example sorting services are further illustrated in FIGS. 11 and 12. Nevertheless, other, or a combination of other, computing devices, services, and modules may be additionally or alternatively used. Also, while the operations are illustrated in a particular order, it should be understood that no particular order is necessary and that one or more operations may be omitted, skipped, and/or reordered. Further, some or all of the operations of the flows of FIGS. 7-9, may be performed offline. For example, the analysis performed in connection with the operations of these flows may be carried out by the sorting service (or another computing service) in a test environment or in an offline environment.

Turning to FIG. 6, the illustrated example flow may start at operation 602, where the sorting offer may access offers for an item. The access may be in response to a request for information about the item received from a computing device, as illustrated in connection with the interface of FIG. 1. The offers may be available through a network-based resource associated with an electronic marketplace. Data representative of the offers may be stored in a data store associated with the network-based resource. Accessing the offers may include retrieving some or all of the data from the data store. The accessed offers may be sortable based on a number or a combination of attributes such as the price and the tax.

At operation 604, the sorting service may sort the offers based on a first attribute having predefined values. For example, the sorting service may sort the offers based on the respective price values. The sorting may be in an ascending order or in any other listing order. Because this attribute (e.g., price) may have predefined values, there may not be a need to further compute these values to sort the offers accordingly. In an example, sizing window may be used to sort the offers based on the price. The sizing window may be set to be equal to a size of a page view for displaying the offers. In another example, another sizing window may be used for sorting based on a second attribute as further described in the next operations. In this example, if the sizing window defines a size comparable to the total number of offers, the sorting based on the first attribute (e.g., price) may be eliminated altogether.

At operation 606, the sorting service may provide the sorted offers for presentation at the computing device. When presented, the sorted offers may be distributed among a plurality of page views, each of which may present a certain number of the offers. These offers may be organized in set, where each page view may be configured to present a set. Such sets may be referred to herein in the example flows as the first set of the offers. Because each set may correspond to a page view and because only particular page view is active (e.g., currently presented to a user), providing the sorted offers may include providing only the first set corresponding to the particular page view. In another example, providing the sorted offers may include providing all or some of these offers independently of the page views (other than the active page view if any). In this example, the computing device (or an application of the computing device) may distribute the sorted offers across the page views. Furthermore, active page view may present an option to further sort based on a different attribute, such as based on an on-the-go attribute such as tax.

At operation 608, the sorting service may select a second set of the offers based on the first set and a sizing window. This selection may be triggered based on, for example, receiving a selection of the option or another request to further sort based on the different attribute, such as the tax. The first set may correspond to the active page view. The sizing window may include a fixed sizing window, an adjustable sizing window, and/or a hybrid sizing window. The second set may represent an expansion of the first based on the sizing window. For example, the sizing window may define a size of the second set such that the second set may include the offers of the first set in addition to other offers contiguous to or neighboring the first set. In an example, the second set may be centered on the first set (e.g., may have an equal number of offers before the center of the first set and an equal number of offers after this center). In another example, the second set may be selected around another predefined value or offer from the first set.

To sort based on the on-the-go attribute, values for this attribute and corresponding to the second set may need to be computed. These values may not be predefined. Instead, receiving the selection of the option or the request for further sorting may trigger computing these values. In addition, to compute these values, certain user, item, or seller-related information may need to be accessed. Some of this information may not be available until after or may be based on receiving the request for the information about the item from the computing device.

At operation 610, the sorting service may compute the values of the on-the-go attribute based on the second set of the offers. For example, these values may be computed only for the offers in the second set and not for remaining offers. The computation may include accessing any needed user, item, or seller-related information (e.g. location of a customer and relative tax of the seller given the customer's location) based on receiving the request for the information about the item. This access may be through determining an account associated with the user and accounts associated with the sellers maintained at the data store or another data store associated with the electronic marketplace. Once that information may be available, the values may be computed accordingly. For example, tax rates of different offers may be identified. Each of the tax values may be computed based on the respective tax rate and price of the associated offer (e.g., by a multiplication of the price by the tax rate).

Further, computing the values may include storing the values in memory or storage (e.g., cached memory or at a data store). This may help reducing the computation of the on-the-go values. For example, if some of the on-the-go values may have been previously computed, these values may not be computed again. Instead, these previously computed values may be accessed from the memory or storage. This may be the case when, for example, sorting may be requested across multiple page views. Because the sizing window may be applied across the multiple page views, certain offers may appear across multiple second sets, where each second set may correspond to a page view. Accordingly, the respective tax values of the common offers across the second sets may be computed once and re-used as applicable.

At operation 612, the sorting service may sort the second set of the offers based on the computed values of the on-the-go attribute. For example, the sorting service may sum, for each offer in the second set, the respective price value with the respective tax value to come up with a total. The sorting service may also arrange (e.g., in an ascending order) the offers in the second set based on the totals.

At operation 614, the sorting service may provide the second set of the offers for presentation, where these offers may be presented using at least the sorting based on the on-the-go attribute. For example, the sorting service may transmit data about the second set of the offers to the computing device. This data may cause or allow the computing device (or an application of the computing device) to present the offers from the second set based on the sorted order of the totals of price and tax values. As explained hereinabove, the second set may be based on the first set, which in turn may correspond to an active page view.

Accordingly, the second set may correspond to the active page view. In an example, providing the second set may include transmitting data about the offers from the second set (e.g., information about the offers and a sorting order) to enable the computing device to present the best sorted offers according to a page size of the page view (e.g., the ten best offers if the page size is ten). In another example, providing the second set may include transmitting only the best sorted offers according to the page size (e.g., transmitting only the ten best offers).

As explained hereinabove, a fixed sizing window may be used in the sorting. FIG. 7 illustrates an example flow for determining a sizing window, which may define a fixed size. In particular, the example flow of FIG. 7 may start at operation 702, where the sorting service may analyze offer heuristics. This analysis may include accessing and processing historical data associated with offers for the item or for an item category that may include the item. The historical data may be analyzed to determine patterns that may indicate correlations between different attributes. Analysis curves, such as the ones illustrated in FIG. 2, may be generated. Further, predicted or expected demand or request for information about the item may be generated. This may allow simulating a user experience, latencies, computing resource usages, and accuracy for various fixed sizes of the fixed sizing windows. In addition, A/B testing may be performed as a part of the analysis.

At operation 704, the sorting service may analyze likelihoods of removing offers. This analysis may look into dropping off offers. For example, the analysis may develop correlations between the fixed size defined by the fixed sizing window and the likelihood of dropping off offers. This may include iteratively setting up the fixed size, measuring frequency of use of offers when computing values and sorting across multiple page views, and determining the likelihood based on the frequency. In addition, the analysis may balance reducing the likelihood of dropping off offers with latency and/or computing resource usage preferences. For example, the fixed size may be defined to avoid exceeding certain latency or computing resource usage.

At operation 706, the sorting service may analyze feedback of item providers, such as merchants associated with the offers. In an example, the feedback may be received in actual operation (on in service) that may use a particular fixed size. In another example, the item providers may be provided access to a development environment or a sandbox. This may allow the item providers to look for the respective offers and implicitly test the use of the fixed size. The feedback may be collected accordingly. In both examples, the feedback may include whether drop offs may have been observed or not. If so, the sorting service may perform additional analysis by iterating through operations 702-706.

At operation 708, the sorting service may generate the fixed sizing window. In particular, the sorting service may consider the analyses performed under operations 702-706 to define a fixed size associated with the sizing window.

In addition or in the alternative to a fixed sizing window, an adjustable sizing window may be used. FIG. 8 illustrates an example flow for determining a sizing window, which may define an adjustable size. This adjustable sizing window may be determined by analyzing data (e.g., offers) associated with an item or with an item category to which the item may belong. In the interest of clarity of explanation, an example using an item category is illustrated.

In particular, the example flow of FIG. 8 may start at operation 802, where the sorting service may determine a limiting factor for the item category. This determination may be based on analyzing, for example, a number of factors associated with the item category, such as historical offers associated with the item category. Other factors related to the item may also be considered, such as the size of the first set and/or the total number of offers. The limiting factor may represent a multiplier for adjusting the size of the second set based on any of these factors. For instance, the limiting factor may be set as an expansion percentage (e.g., ten percent or some other number) relative to the size of the first set, an expansion percentage based on prices (or any other predefined attribute) from the first set or the total number of offers, a fraction of the total number offers, or a variable expansion percentage or variable fraction based on a location on a tracked curve (e.g., the curves 206-210 and the relative page view 212 of FIG. 2). In an illustrative example associated with using tax as the on-the-go attribute, the limiting factor may be set as the maximum tax rate observed in the historical offers.

At operation 804, the sorting service may select a predefined value from the first set. In other words, the sorting service may select an offer from the first set and apply the limiting factor to the respective predefined value. Continuing with the illustrative example, the sorting service may select the highest-priced offer in the first set and multiply the associated price value by the maximum tax rate.

At operation 806, the sorting service may compute an offset value based on the limiting factor and the predefined value. For example, the result of applying the limiting factor to the predefined value may be set at the offset value. Continuing with the illustrative example, the sorting service may set the offset value as the result of multiplying the highest price value by the maximum tax rate.

At operation 808, the sorting service may generate the adjustable sizing window based on the offset value. For example, the sorting service may define the adjustable size as a function of the offset value. In one illustrative example, the adjustable size may be set as equal to the size of the first set and at least the offset value. In another illustrative example, the adjustable size may be set as a range based on the offset value and predefined values from the first set, such that offers having predefined values falling within this range may be included in the second set. Referring back to the tax rate example, the adjustable size may be a range in this case, where offers having prices within that range would be added to the second set.

In certain situations, using a hybrid sizing window may be desired. FIG. 9 illustrates an example flow for determining a sizing window, which may define an adjustable size limited by a fixed bound. In particular, the example flow of FIG. 9 may start at operation 902, where the sorting service may determine an adjustable size. For example, the sorting service may perform some or all of the operations described in connection with FIG. 8 to compute the adjustable size.

At operation 904, the sorting service may compute an upper bound. This upper bound may cap the maximum size or represent a ceiling that the adjustable size may reach but not exceed. In other words, the upper bound may limit the maximum number of offers that may be included in the second set. In an example, the sorting service may perform some or all of the operations described in connection with FIG. 7 to compute the upper bound. For instance, the sorting service may set the upper bound based on latency factor, such as a not-to-exceed latency, and/or a computing resource usage factor, such as a not-to-exceed computing resource usage.

At operation 906, the sorting service may compute a lower bound. This lower bound may cap the minimum size or represent a floor that the adjustable size may need to meet. In other words, the lower bound may limit the minimum number of offers that may be included in the second set. In an example, the sorting service may perform some or all of the operations described in connection with FIG. 7 to compute the lower bound. For instance, the sorting service may set the lower bound based on a desired user experience and/or accuracy factors.

At operation 908, the sorting service may generate a hybrid sizing window. The hybrid sizing window may define an adjustable size based on operation 902, limited by an upper and/or lower bound based on operation 904 and 906, respectively.

As described herein, each type of sizing window may provide different features. For example, the fixed sizing window may provide predictable latency and computing resource usage. In comparison, the adjustable sizing window may provide more accurate sorting. The hybrid sizing window may provide a good balance between latency and computing resource usage on one hand and sorting accuracy and user experience on the other hand. In certain situations, it may be desirable to select and/or switch between the different types of sizing window to take advantage of the respective features. This selection and/or switching may be based on a factor that may be associated with the item (or the associated item category). For example, the factor may consider various aspects of the data to be sorted (e.g., the offers in the first set) and/or the total size of the data (e.g., the total number of offers). FIG. 10 illustrates an example flow for performing this type of selection and/or switching.

In particular, the example flow may default to one of the switching windows. This default may be defined per item or per item category. At time intervals or based on a trigger event (e.g., feedback of a particular seller, or amount of feedback exceeding a threshold), a factor may be identified and used to confirm the use of the default sizing window, select another sizing window, and/or switch to the selected sizing window. The example flow of FIG. 10 may start at operation 1002, where the sorting service may identify the factor associated with the item. For example, the sorting service may look up the total number of offers, the number of offers within the first set, variability of predefined values with respect to the first set or across the total number of offers, or other item-related factors.

At operation 1004, the sorting service may compare a size of the data (e.g., the total number of offers) to a threshold. The threshold may be defined based on, for example, an analysis of historical data associated with offers. In another example, the threshold may be defined base on latency and/or computing resource usage. If the size of the data exceeds the threshold, operation 1006 may be performed, where the sorting service may select and switch to a fixed sizing window (if such a window is not the default); otherwise, operation 1008 may be performed, where the sorting service may keep using the default sizing window. Generally, the higher the number of total offers (e.g., in the thousands), the more attractive the selection and usage of the fixed sizing window may be.

At operation 1010, the sorting service may compare variability (e.g., statistical variability) of predefined values to a threshold, where the predefined values may be associated with some or all of the data to be sorted. In an example, the predefined values may correspond to offers from the first set. In another example, the predefined values may correspond to all of the offers. The threshold may be defined based on, for example, an analysis of historical data associated with offers. In another example, the threshold may be defined base on accuracy and/or user experience (e.g., quality of service). If the size of the data exceeds the threshold, operation 1012 may be performed, where the sorting service may select and switch to an adjustable sizing window (if such a window is not the default); otherwise, operation 1008 may be performed, where the sorting service may keep using the default sizing window. Generally, the higher the variability of price values within the first set, the more attractive the selection and usage of the adjustable sizing window may be.

At operation 1014, the sorting service may compare a size of the data to be sorted (e.g., the number of offers in the first set) to a threshold. The threshold may be defined based on, for example, an analysis of historical data associated with offers. In another example, the threshold may be defined base on latency, computing resource usage, accuracy, and/or user experience. If the size of the data exceeds the threshold, operation 1016 may be performed, where the sorting service may select and switch to a hybrid sizing window (if such a window is not the default); otherwise, operation 1008 may be performed, where the sorting service may keep using the default sizing window.

Figure 11:
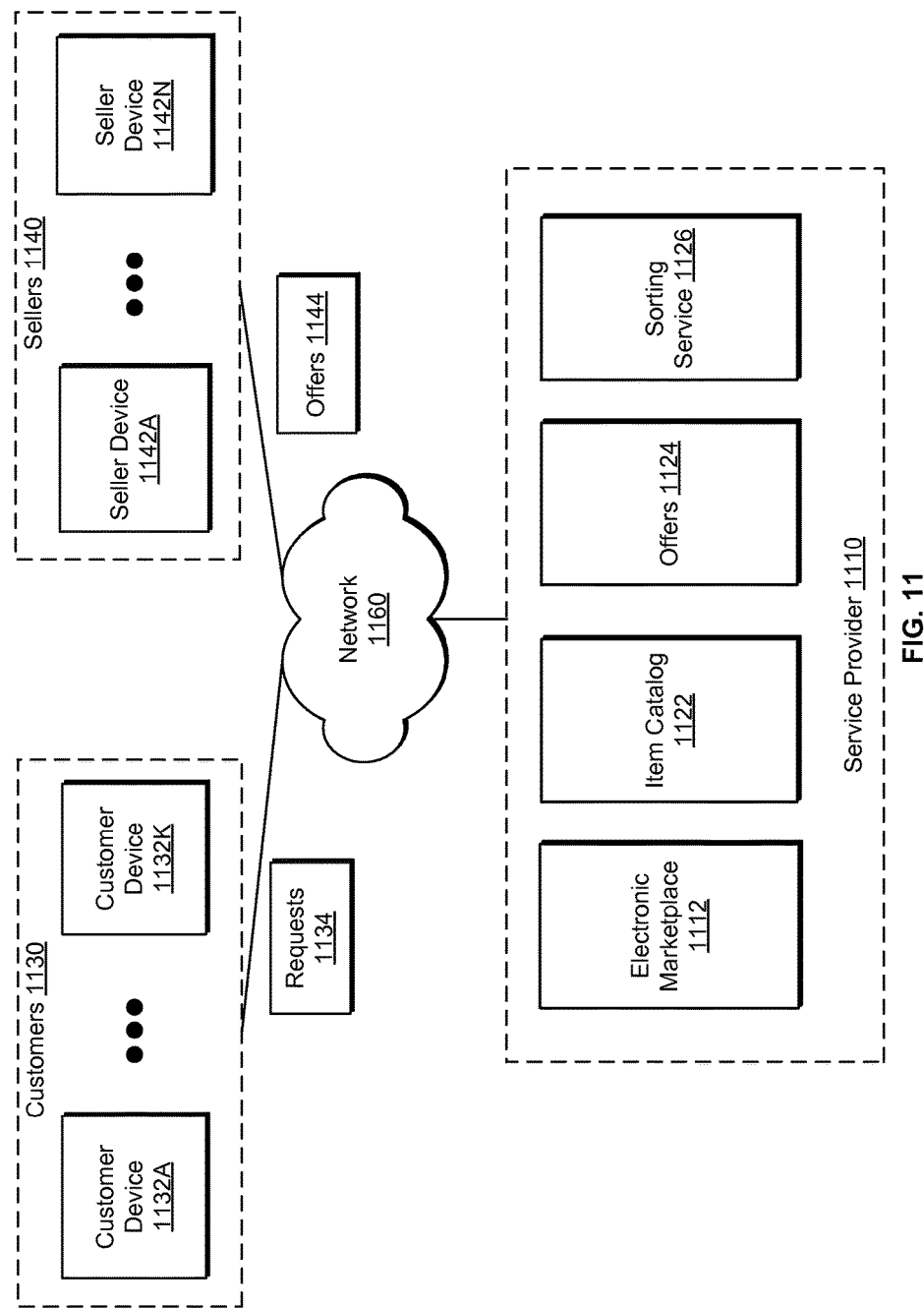
FIG. 11 illustrates an example computing environment associated with an electronic marketplace.

Turning to FIG. 11, that figure illustrates a computing environment for implementing the above-described features within the context of an electronic marketplace. In particular, a service provider 1110 of an electronic marketplace 1112 may implement a sorting service 1126 on a service provider computing resource to enable sorting of data associated with an item, such as sorting by predefined and on-the-go attributes of offers for the item.

The electronic marketplace 1112 may offer different items. Offered items may be cataloged in an item catalog 1122. In addition, the offered items may be ordered from the electronic marketplace 1112 according to offers 1124. The offers 1124 may use data from the item catalog 1122 to describe some of the item attributes and offer attributes. This may include, for example, listing predefined values associated with predefined attributes.

A network-based document (e.g., a web page) of the electronic marketplace 1112 may be associated with an item. For example, the network-based resource document may allow sellers 1140 and/or the service provider 1110 to provide information for ordering an item. This may include the sellers listing offers 1144 at the electronic marketplace 1112. The network-based document may also allow customers 1130 to review this information and make an order or purchase decision. The customers 1130 may, for example submit requests 1134 for offers. In an example, the network-based resource document may present information from the item catalog 1122 for the offers 1124. The presented information may sort the offers based on different attributes.

The sorting service 1126 may be configured to receive the requests 1134 from customer devices 1132A-K of customers 1130 and to analyze the offers 1124 in response to the requests 1134. The sorting service 1126 may also be configured to access the item catalog 1122 to retrieve the predefined values and to compute values for the on-the-go attribute(s) based on the requests 1134. Once the different values are determined, the sorting service 1126 may be configured to sort the various offers based on these values and a sizing window(s) and to provide the sorted offers back to the customer devices 1132A-K.

As such, the service provider 1110 may operate the electronic marketplace 1112 to facilitate interactions between the service provider 1110, the customers 1130, and the sellers 1140 over a network 1160. Each one of the sellers 1140 may operate one or more seller devices 1142A-N to access the electronic marketplace 1112 and perform various seller-related functions. A customer may be an item recipient, a buyer, or any user reviewing, browsing, ordering, obtaining, purchasing, or returning an item of a seller. Each one of the customers 1130 may operate one or more customer devices 1132A-K to access the electronic marketplace 1112 and perform various customer-related functions.

Figure 12:
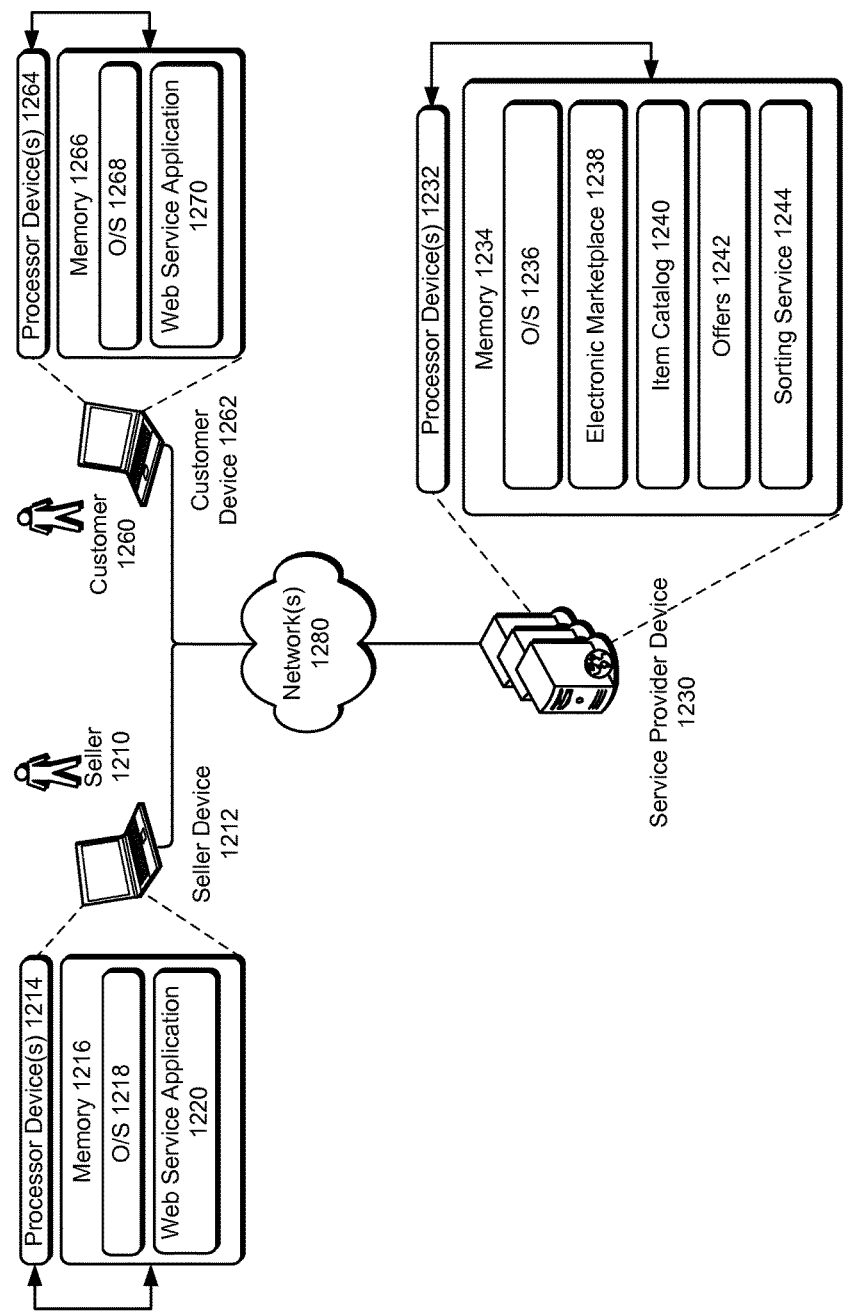
FIG. 12 illustrates an example architecture for providing a network-based resource, including at least one user device and/or one or more service provider devices connected via one or more networks, according to embodiments.

Turning to FIG. 12, that figure illustrates an example end-to-end computing environment for receiving request for information and providing sorted data in response. In this example, a service provider may implement a sorting service, such as the sorting service 1126 of FIG. 11, within the context of, for example, an electronic marketplace available to users, such as the customers 1130 and the sellers 1140 of FIG. 11.

In a basic configuration, a seller 1210 may utilize a seller device 1212 to access local applications, a web service application 1220, a seller account accessible through the web service application 1220, a web site or any other network-based resources via one or more networks 1280. In some aspects, the web service application 1220, the web site, and/or the seller account may be hosted, managed, and/or otherwise provided by one or more computing resources of the service provider, such as by utilizing one or more service provider devices 1230. The seller 1210 may use the local applications and/or the web service application 1220 to interact with the network-based resources of the service provider. These transactions may include, for example, offering items for sale.

In some examples, the seller device 1212 may be any type of computing devices such as, but not limited to, a mobile phone, a smart phone, a personal digital assistant (PDA), a laptop computer, a thin-client device, a tablet PC, etc. In one illustrative configuration, the seller device 1212 may contain communications connection(s) that allow the seller device 1212 to communicate with a stored database, another computing device or server, seller terminals, and/or other devices on the networks 1280. The seller device 1212 may also include input/output (I/O) device(s) and/or ports, such as for enabling connection with a keyboard, a mouse, a pen, a voice input device, a touch input device, a display, speakers, a printer, etc.

The seller device 1212 may also include at least one or more processing units (or processor device(s)) 1214 and one memory 1216. The processor device(s) 1214 may be implemented as appropriate in hardware, computer-executable instructions, firmware, or combinations thereof. Computer-executable instructions or firmware implementations of the processor device(s) 1214 may include computer-executable or machine-executable instructions written in any suitable programming language to perform the various functions described.

The memory 1216 may store program instructions that are loadable and executable on the processor device(s) 1214, as well as data generated during the execution of these programs. Depending on the configuration and type of seller device 1212, the memory 1216 may be volatile (such as random access memory (RAM)) and/or non-volatile (such as read-only memory (ROM), flash memory, etc.). The seller device 1212 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1216 may include multiple different types of memory, such as static random access memory (SRAM), dynamic random access memory (DRAM), or ROM.

Turning to the contents of the memory 1216 in more detail, the memory may include an operating system (O/S) 1218 and the one or more application programs or services for implementing the features disclosed herein including the web service application 1220. In some examples, the seller device 1212 may be in communication with the service provider devices 1230 via the networks 1280, or via other network connections. The networks 1280 may include any one or a combination of many different types of networks, such as cable networks, the Internet, wireless networks, cellular networks, and other private and/or public networks. While the illustrated example represents the seller 1210 accessing the web service application 1220 over the networks 1280, the described techniques may equally apply in instances where the seller 1210 interacts with the service provider devices 1230 via the seller device 1212 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 1260 may utilize customer device 1262 to access local applications, a web service application 1270, a customer account accessible through the web service application 1270, a web site, or any other network-based resources via the networks 1280. In some aspects, the web service application 1270, the web site, and/or the user account may be hosted, managed, and/or otherwise provided by the service provider devices 1230 and may be similar to the web service application 1220, the web site accessed by the computing device 1212, and/or the seller account, respectively.

The customer 1260 may use the local applications and/or the web service application 1270 to conduct transactions with the network-based resources of the service provider. These transactions may include, for example, searching for items offered by the seller 1210 at the network-based resources, receiving offers for the items, sorting the offers based on different attributes, ordering items, and other transactions.

In some examples, the customer device 1262 may be configured similarly to the seller device 1212 and may include at least one or more processing units (or processor device(s)) 1264 and one memory 1266. The processor device(s) 1264 may be implemented as appropriate in hardware, computer-executable instructions, firmware, or combinations thereof similarly to the processor device(s) 1214. Likewise, the memory 1266 may also be configured similarly to the memory 1216 and may store program instructions that are loadable and executable on the processor device(s) 1264, as well as data generated during the execution of these programs. For example, the memory 1266 may include an operating system (O/S) 1268 and the one or more application programs or services for implementing the features disclosed herein including the web service application 1270.

As described briefly above, the web service applications 1220 and 1270 may allow the seller 1210 and customer 1260, respectively, to interact with the service provider devices 1230 to conduct transactions involving items. The service provider devices 1230, perhaps arranged in a cluster of servers or as a server farm, may host the web service applications 1220 and 1270. These servers may be configured to host a web site (or combination of web sites) viewable via the computing devices 1212 and 1262. Other server architectures may also be used to host the web service applications 1220 and 1270. The web service applications 1220 and 1270 may be capable of handling requests from many sellers 1210 and customers 1260, respectively, and serving, in response, various interfaces that may be rendered at the computing devices 1212 and 1262 such as, but not limited to, a web site. The web service applications 1220 and 1270 may interact with any type of web site that supports interaction, including social networking sites, electronic retailers, informational sites, blog sites, search engine sites, news and entertainment sites, and so forth. As discussed above, the described techniques may similarly be implemented outside of the web service applications 1220 and 1270, such as with other applications running on the computing devices 1212 and 1262, respectively.

The service provider devices 1230 may, in some examples, provide network-based resources such as, but not limited to, applications for purchase and/or download, web sites, web hosting, client entities, data storage, data access, management, virtualization, etc. The service provider devices 1230 may also be operable to provide web hosting, computer application development, and/or implementation platforms, or combinations of the foregoing to the seller 1210 and customer 1260.

The service provider devices 1230 may be any type of computing device such as, but not limited to, a mobile phone, a smart phone, a personal digital assistant (PDA), a laptop computer, a desktop computer, a server computer, a thin-client device, a tablet PC, etc. The service provider devices 1230 may also contain communications connection(s) that allow service provider devices 1230 to communicate with a stored database, other computing devices or servers, seller terminals, and/or other devices on the network 1280. The service provider devices 1230 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 1230 may be executed by one more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 1230 may be in communication with the computing devices 1212 and 1262 via the networks 1280, or via other network connections. The service provider devices 1230 may include one or more servers, perhaps arranged in a cluster, or as individual servers not associated with one another.

In one illustrative configuration, the service provider devices 1230 may include at least one or more processing units (or processor devices(s)) 1232 and one memory 1234. The processor device(s) 1232 may be implemented as appropriate in hardware, computer-executable instructions, firmware, or combinations thereof. Computer-executable instruction or firmware implementations of the processor device(s) 1232 may include computer-executable or machine-executable instructions written in any suitable programming language to perform the various functions described.

The memory 1234 may store program instructions that are loadable and executable on the processor device(s) 1232, as well as data generated during the execution of these programs. Depending on the configuration and type of the service provider devices 1230, the memory 1234 may be volatile (such as random access memory (RAM)) and/or non-volatile (such as read-only memory (ROM), flash memory, etc.). The service provider devices 1230 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1234 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 1234 in more detail, the memory may include an operating system (O/S) 1236, code for an electronic marketplace 1238, data related to an item catalog 1240, data related to available offers 1242, data related to offers 1244, and code for the sorting service 1244. Although FIG. 12 illustrates the various data as stored in the memory 1234, this data or portion of the data may be additionally or alternatively stored at a storage device remotely accessible to the service provider devices 1230.

Figure 13:
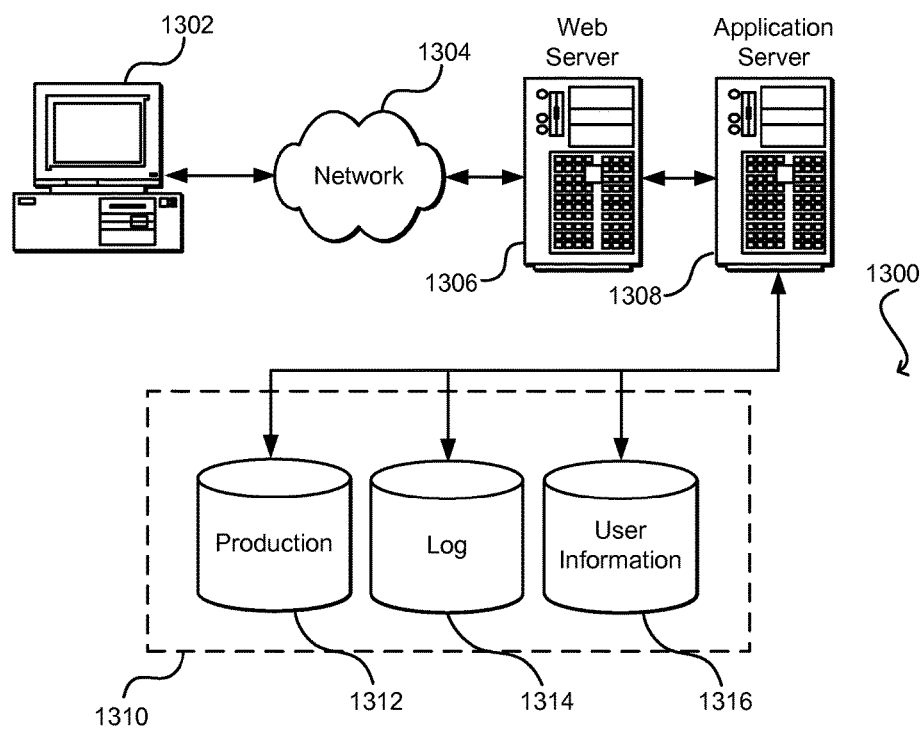
FIG. 13 illustrates an environment in which various embodiments may be implemented.

Turning to FIG. 13, the figure illustrates aspects of an example environment 1300 capable of implementing the above-described structures and functions. As will be appreciated, although a Web-based environment is used for purposes of explanation, different environments may be used, as appropriate, to implement various embodiments. The environment includes an electronic client device 1302, which may include any appropriate device operable to send and receive requests, messages, or information over an appropriate network(s) 1304 and convey information back to a user of the device. Examples of such client devices include personal computers, cell phones, handheld messaging devices, laptop computers, set-top boxes, personal data assistants, electronic book readers, or any other computing device. The network(s) 1304 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there may be several application servers, layers, or other elements, processes or components, which may be chained or otherwise configured, which may interact to perform tasks such as obtaining data from an appropriate data store. As used herein, the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 1308 provides access control services in cooperation with the data store 1310, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1302 and the application server 1308, may be handled by the Web server 1306. It should be understood that the Web and application servers 1306 and 1308 are not required and are merely example components, as structured code discussed herein may be executed on any appropriate device or host machine as discussed elsewhere herein.

The data store 1310 may include several separate data tables, databases or other data storage mechanisms and media for storing data relating to a particular aspect. For example, the data store 1310 illustrated includes mechanisms for storing production data 1312 and user information 1316, which may be used to serve content for the production side. The data store 1310 is also shown to include a mechanism for storing log data 1314, which may be used for reporting, analysis, or other such purposes. It should be understood that there may be many other aspects that may need to be stored in the data store 1310, such as for page image information and to access correct information, which may be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 1302. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of environment 1300 in FIG. 13 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including, without limitation, those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, from a computing device, a request for information about an item offered at an electronic marketplace;
    accessing, by a computer system associated with the electronic marketplace, a set of offers available from the electronic marketplace for the item, the set having a total size and being sortable based at least in part on a first attribute and a second attribute, the first attribute associated with predefined values, the second attribute associated with values to be computed based at least in part on the request;
    causing the computing device to present, in a page view, a first subset of the offers sorted based at least in part on the predefined values of the first attribute and to present an option for sorting based at least in part on the second attribute, the first subset having a first size based at least in part on the page view;

receiving, from the computing device, a selection of the option for sorting based at least in part on the second attribute;

setting, by the computer system, a sizing window based at least in part on the second attribute and on the selection of the option, the sizing window defining a second size for a second subset of the offers, the second size being larger than the first size of the first subset and smaller than the total size of the set;

selecting, by the computer system, the second subset of the offers based at least in part on the sizing window and a presentation of the first subset in the page view, the second subset comprising the first subset and an additional offer excluded from the first subset;

computing, by the computer system, the values of the second attribute for the second subset of the offers;

sorting the second subset of the offers based at least in part on the computed values; and causing the computing device to present in the page view a portion of the second subset of the offers based at least in part on the sorting of the second set of the offers.

2. The computer-implemented method of claim 1, wherein the sizing window defines a fixed size for the second size of the second subset based at least in part on one or more heuristics about the offers.

3. The computer-implemented method of claim 1, wherein the sizing window defines an adjustable size for the second size of the second subset based at least in part on at least one of: a limiting factor determined based at least in part on an item category to which the item belongs, a total number of the offers, or the first size of the first subset.

4. The computer-implemented method of claim 1, wherein the sizing window defines an adjustable size for the second size of the second subset, and wherein the adjustable size is capped based at least in part on a latency factor.

5. The computer-implemented method of claim 1, wherein the sizing window is selected from a fixed sizing window and an adjustable sizing window based at least in part on the offers, wherein the fixed sizing window defines a fixed size, and wherein the adjustable sizing window defines an adjustable size.

6. A non-transitory computer readable storage medium storing instructions that, when executed at a computing system, cause the computing system to at least:

access data about an item, the data having a total size and to be ordered based at least in part on a first attribute and a second attribute associated with the item, the first attribute taking on predefined values, the second attribute taking on values to be computed in response to a request for ordering the data based at least in part on the second attribute;

determine a first set of the data for presentation to a user in a page view, the first set ordered based at least in part on the predefined values of the first attribute, the first set having a first size based at least in part on the page view;

set a sizing window based at least in part on a request to sort the first data according to the second attribute, the sizing window defining a second size for a second set of the data, the second size being larger than the first size of the first set and smaller than the total size of the data;

select the second set of the data based at least in part on the sizing window and the presentation of the first set in the page view, the second set comprising the first set and additional data excluded from the first set;

compute the values of the second attribute for the second set of the data;

order the second set of the data based at least in part on the computed values; and provide a subset of the second set of the data for presentation to the user in the page view based at least in part on ordering the second set of the data.

7. The non-transitory computer readable storage medium of claim 6, wherein the data comprises offers available from a network-based resource for the item, wherein the first attribute corresponds to a price at which the item is offered, and wherein the second attribute corresponds to a tax involved in purchasing the item.

8. The non-transitory computer readable storage medium of claim 6, wherein ordering the second set of the data is further based at least in part on the predefined values of the first attribute.

9. The non-transitory computer readable storage medium of claim 6, wherein the sizing window defines the second size of the second set based at least in part on one of: historical data associated with computing the values of the second attribute or latency associated with computing the values for the second set.

10. The non-transitory computer readable storage medium of claim 9, wherein the data comprises offers for the item, and wherein the sizing window further defines the second size of the second set based at least in part on a likelihood of removing an offer of the offers from the second set based at least in part on a respective value of the second attribute.

11. The non-transitory computer readable storage medium of claim 9, wherein the data comprises offers from providers of the item, and wherein the sizing window further defines the second size of the second set based at least in part on feedback of at least a provider of the providers.

12. The non-transitory computer readable storage medium of claim 6, wherein the sizing window defines the second size of the second set as an adjustable size based at least in part on an item category that the item belongs to and on the first set of the data.

13. The non-transitory computer readable storage medium of claim 12, wherein the second size of the second set is defined by at least:

identifying a limiting factor associated with the item category;

selecting a predefined value from the predefined values, wherein the predefined value is associated with an element of the first set of data;

computing an offset value based at least in part on the limiting factor and the predefined value; and sizing the second set of the data based at least in part on the first set of the data and the offset value.

14. A system comprising:

a processor; and a memory comprising instructions that, when executed with the processor, cause the system to at least:

receive a request for information about an item;

access data about the item, the data having a total size and to be ordered based at least in part on a first attribute and a second attribute associated with the item, the first attribute having first values that are determined by using an amount of computing resource usage, the second attribute having second values that are determined by using a larger amount of computing resource usage;

determine a first set of the data based at least in part on the request, the first set ordered based at least in part on the first values of the first attribute and presented in a page view, the first set having a first size based at least in part on the page view;

set a sizing window based at least in part on an additional request to sort the first data according to the second attribute, the sizing window defining a second size for a second set of the data, the second size being larger than the first size of the first set and smaller than the total size of the data;

select the second set of the data based at least in part on the sizing window and the presentation of the first set in the page view, the second set comprising the first set and additional data excluded from the first set;

compute the second values of the second attribute for the second set of the data; and provide the second set of the data ordered based at least in part on the computed second values.

15. The system of claim 14, wherein the sizing window defines the second size of the second set as an adjustable size, wherein the adjustable size is limited by an upper bound based at least in part on latency associated with computing the second values for the second attribute.

16. The system of claim 14, wherein the data comprises offers for the item, wherein providing the first set of the data comprises causing a computing device to present a set of the offers at an interface of the computing device, wherein the interface comprises multiple page views and limits a number of presentable offers per page view, and wherein selecting the second set is further based at least in part on presented offers in the page view.

17. The system of claim 14, wherein the sizing window is selected from a plurality of sizing windows based at least in part on a factor associated with the item.

18. The system of claim 17, wherein the sizing window is selected as a fixed sizing window based at least in part on the factor indicating that the total size of the data exceeds a threshold, and wherein the fixed sizing window defines a fixed size.

19. The system of claim 17, wherein the sizing window is selected as an adjustable sizing window based at least in part on the factor indicating that a variability of the predefined values of the first attribute exceeds a threshold, and wherein the adjustable sizing window defines an adjustable size.

20. The system of claim 17, wherein the sizing window is selected as a hybrid sizing window based at least in part on the factor indicating that the first size of the first set of data exceeds a threshold, and wherein the hybrid sizing window defines an adjustable size limited by an upper bound.

21. The system of claim 14, wherein providing the second set of the data ordered based at least in part on the computed second values comprises at least one of: sorting, grouping, clustering, or filtering the second set of the data based at least in part on the computed second values.

22. The system of claim 14, wherein the sizing window comprises a multi-dimensional sizing window configured to facilitate ordering the data based on a plurality of attributes.

* * * * *